United States Patent [19]

Wei

[11] Patent Number: 5,029,185
[45] Date of Patent: Jul. 2, 1991

[54] CODED MODULATION FOR MOBILE RADIO

[75] Inventor: Lee-Fang Wei, Lincroft, N.J.

[73] Assignee: AT&T Bell Laboratories, Murray Hill, N.J.

[21] Appl. No.: 386,185

[22] Filed: Jul. 28, 1989

[51] Int. Cl.⁵ .......................................... H04B 14/06
[52] U.S. Cl. ...................................... 375/27; 371/43; 375/39
[58] Field of Search ................. 375/25, 27, 39.42; 371/43, 44, 45; 332/103; 370/20

[56] References Cited

U.S. PATENT DOCUMENTS 4,483,012  11/1984  Wei ......................................... 371/43
4,493,082   1/1985  Cumberton .............................. 371/43
4,520,490   5/1985  Wei ......................................... 371/43
4,597,090   6/1986  Forney, Jr. .............................. 371/42
4,713,817  12/1987  Wei ......................................... 371/43
4,755,998   7/1988  Gallager ................................. 375/39

Primary Examiner—Stephen Chin
Attorney, Agent, or Firm—Ronald D. Slusky

[57] ABSTRACT

Interleaved block-coded modulation with built-in time diversity is used for fading channel applications. Various modulated block codes of various dimensionalities are disclosed, each built up from an M-DPSK constellation. The signal points making up each codeword are re-ordered by an interleaver in a way which matches the interleaving to the block code, thereby increasing the effective size of the interleaver.

44 Claims, 13 Drawing Sheets

| INPUT BIT PATTERN | FIRST 2D POINT | SECOND 2D POINT |
|---|---|---|
| 0 0 0 | 0 (0 0 0) | 0 (0 0 0) |
| 0 0 1 | 1 (0 0 1) | 5 (1 0 1) |
| 0 1 1 | 2 (0 1 0) | 2 (0 1 0) |
| 0 1 0 | 3 (0 1 1) | 7 (1 1 1) |
| 1 1 0 | 4 (1 0 0) | 4 (1 0 0) |
| 1 1 1 | 5 (1 0 1) | 1 (0 0 1) |
| 1 0 1 | 6 (1 1 0) | 6 (1 1 0) |
| 1 0 0 | 7 (1 1 1) | 3 (0 1 1) |

|   | 2 |
|---|---|
| $P_1$ | $P_2$ |
| $P_3$ | $P_4$ |
| $P_5$ | $P_6$ |
| ⋮ | ⋮ |
| $P_{2J-1}$ | $P_{2J}$ |

J (to the left of the table)

| INPUT BIT PATTERN | 4D-SUBSET PAIR |
|---|---|
| 0 0 | $(S_0, S_0)$ |
| 0 1 | $(S_1, S_2)$ |
| 1 1 | $(S_2, S_1)$ |
| 1 0 | $(S_3, S_3)$ |

32-ELEMENT
4D 8-PSK CONSTELLATION
((EVEN, EVEN), (ODD, ODD))

FIG. 9

| INPUT BIT PATTERN | 4D-SUBSET PAIR |
|---|---|
| 0 0 0 0 | $(T_0, T_0)$ |
| 0 0 0 1 | $(T_4, T_8)$ |
| 0 0 1 0 | $(T_8, T_4)$ |
| 0 0 1 1 | $(T_{12}, T_{12})$ |
| 0 1 0 0 | $(T_2, T_3)$ |
| 0 1 0 1 | $(T_6, T_{11})$ |
| 0 1 1 0 | $(T_{10}, T_7)$ |
| 0 1 1 1 | $(T_{14}, T_{15})$ |
| 1 1 0 0 | $(T_1, T_1)$ |
| 1 1 0 1 | $(T_5, T_9)$ |
| 1 1 1 0 | $(T_9, T_5)$ |
| 1 1 1 1 | $(T_{13}, T_{13})$ |
| 1 0 0 0 | $(T_3, T_2)$ |
| 1 0 0 1 | $(T_7, T_{10})$ |
| 1 0 1 0 | $(T_{11}, T_6)$ |
| 1 0 1 1 | $(T_{15}, T_{14})$ |

| | 4 | | |
|---|---|---|---|
| $P_1$ | $P_2$ | $P_3$ | $P_4$ |
| $P_5$ | $P_6$ | $P_7$ | $P_8$ |
| $P_9$ | $P_{10}$ | $P_{11}$ | $P_{12}$ |
| . | . | . | . |
| . | . | . | . |
| . | . | . | . |
| $P_{4J-3}$ | $P_{4J-2}$ | $P_{4J-1}$ | $P_{4J}$ |
| A | B | C | D |

COLUMNS OF SIGNAL POINTS ARE OUTPUT
IN THE ORDER A, C, B, D.

CODED MODULATION FOR MOBILE RADIO

BACKGROUND OF THE INVENTION

The present invention relates to coded modulation techniques and, more particularly, the use of such techniques in fading channel applications, e.g., digital cellular mobile radio.

During the past decade, trellis-coded modulation has proven to be a practical power-efficient and bandwidth-efficient modulation technique for channels with additive white Gaussian noise (AWGN). This technique has now been widely used in commercial telephone-line modems and has resulted in an increase of line rates of those modems to as much as 19.2 Kbits/s.

More recently, those in the art have investigated the applicability of trellis-coded modulation to a further class of channels—specifically, fast-fading channels, i.e., channels in which the signal amplitude can vary so drastically over short time intervals that it is not practical to track it and thereby to accurately recover the transmitted information. Indeed, the signal amplitude may be so weak that, even if it could be tracked, accurate data recovery may, again, not be possible. Mobile radio channels of various types fall within this category. As in telephone-line modem applications, the use of trellis codes in such channels provides so-called "coding gain" in signal power (compared to so-called "uncoded" modulation approaches). The ultimate result is an enhanced capability for accurate information recovery without requiring additional signal bandwidth. Unfortunately, it turns out that the improvement in error rate performance achieved for a given amount of coding gain is significantly less for the fast-fading channel than for, say, the telephone-line channel. For example, 3 dB of coding gain can provide as much as three orders of magnitude improvement in the error rate for the telephone-line channel, but only about a factor-of-three improvement for the fast-fading channel. This disparity arises principally out of the very nature of the fast-fading channel, i.e., its fading characteristics.

SUMMARY OF THE INVENTION

The prior art has recognized that it is possible to take into account the occurrence of fast fades in the channel—and thereby provide enhanced coding gain—by using a combination of (a) particular trellis codes exhibiting so-called "built-in time diversity" with (b) interleaving-/deinterleaving techniques which re-order the transmitted signal points. At the same time, however, I have recognized that, in general, such prior art solutions may be less than wholly satisfactory for particular applications. Digital cellular mobile radio (hereafter referred to more simply as "mobile radio") is a notable example.

In particular, realization of the potential coding gain of such schemes necessitates the use of an interleaver/-deinterleaver whose characteristics are such that a significant amount of transmission delay may be introduced at both the transmitter and the receiver. The real-time nature of, for example, mobile radio systems means that such delay may have a significant negative impact on system performance. Moreover, realization of the potential coding gain entails even greater delay in systems which use a time-division-multiple-access (TDMA) approach—which has now been incorporated into the North American standard for next-generation mobile radio. (This effect arises from the fact that, in a TDMA system, the signal points originating from a particular one source are much closer to one another in time than would otherwise be the case.) Additionally, the fact that a trellis decoder, in order to output any particular signal point, needs to wait until it has received a number of subsequent signal points may result in certain yet additional delays and/or may waste some of the channel capacity in some specific applications. Such applications include systems involving speech encoders which encode on a block-by-block basis.

In accordance with the present invention, I have realized that utilizing interleaved block-coded modulation with built-in time diversity can achieve comparable or better coding gain than the above-described prior art while affording a large number of advantages thereover. Such advantages include: less implementational complexity; less interleaver/deinterleaver and decoding delay; the availability of higher bandwidth efficiency for some codes; enhanced flexibility in arriving at a system design having a desired tradeoff among complexity, power efficiency and bandwidth efficiency; and fewer system issues in general.

In preferred embodiments, a constant-amplitude type of signal constellation is used in order to account for the fast variations in signal amplitude that are the hallmark of mobile radio and other fast-fading channels. Moreover, due to the fast variation in carrier phase that occurs in such channels, use of a non-coherent differential detection method is preferred. Both of these criteria are advantageously satisfied by the use of M-point differential phase shift keying, or M-DPSK.

In accordance with a feature of the invention, the particular way in which the signal points are re-ordered by the interleaver is matched to the particular block code being used, thereby advantageously increasing the effective, although not the actual, size of the interleaver and thus contributing to the aforementioned reduced interleaver/deinterleaver delay.

BRIEF DESCRIPTION OF THE DRAWING

In the drawing,

FIGS. 8 and 9 graphically depict a third block-coded modulation scheme in accordance with the invention;

FIG. 10 illustrates the operation of the interleaver with respect to the third block-coded modulation scheme;

DETAILED DESCRIPTION

Figure 1:
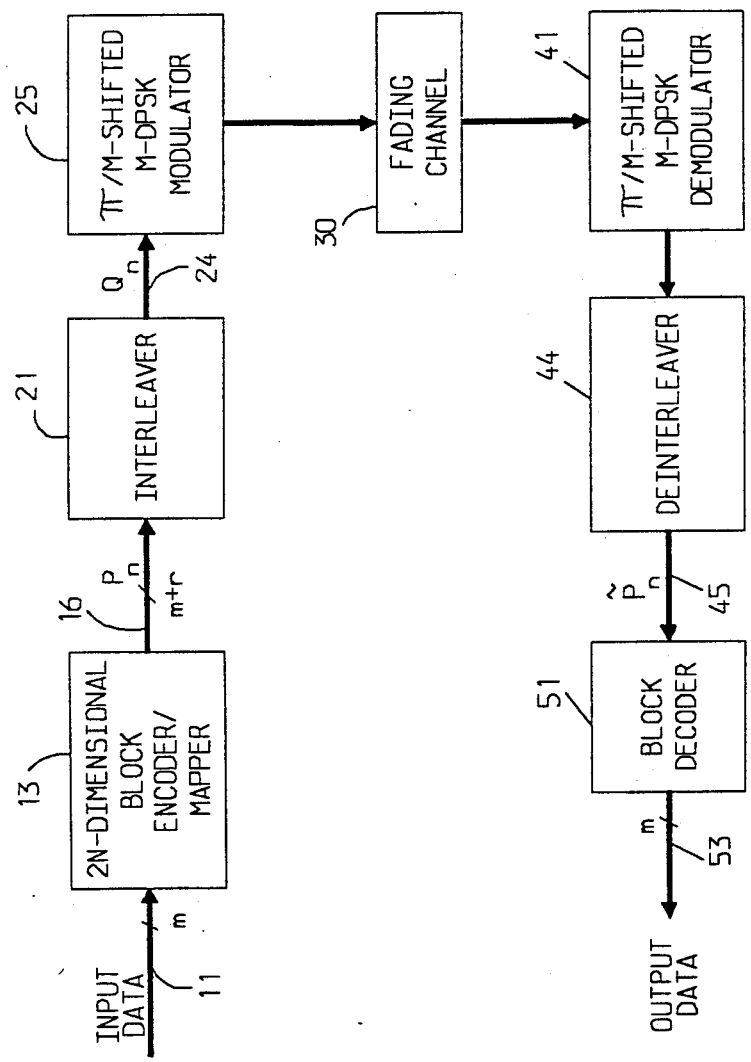
FIG. 1 is a block diagram of a data communications system embodying the principles of the invention.

In the transmission system of FIG. 1, input data on leads 11 is applied to a 2N-dimensional block encoder/mapper 13 at a rate of m bits per T-second signalling interval, where m can be an integer or a fractional number. Block encoder/mapper 13 accumulates a block of input data comprised of N signalling intervals' worth of bits and then uses a selected 2N-dimensional block code to encode the accumulated $N \times m$ bits into N groups of (m+r) encoded bits those groups being provided successively on leads 16. Here, the parameter r is the average number of redundant bits per signalling interval introduced by the block encoder/mapper 13. Each allowed bit pattern of the (m+r)-bit group is associated with a particular signal point of a two-dimensional (2D) $M(\leq 2^{m+r})$-PSK constellation, where M is a selected integer. Specifically, the signal point on leads 16 during the $n^{th}$ signalling interval is denoted $P_n$. The block code is referred to as being "2N-dimensional" because each signal point has 2 dimensions and each "codeword" output by the block encoder/mapper 13 is represented by N signal points.

Figure 2:
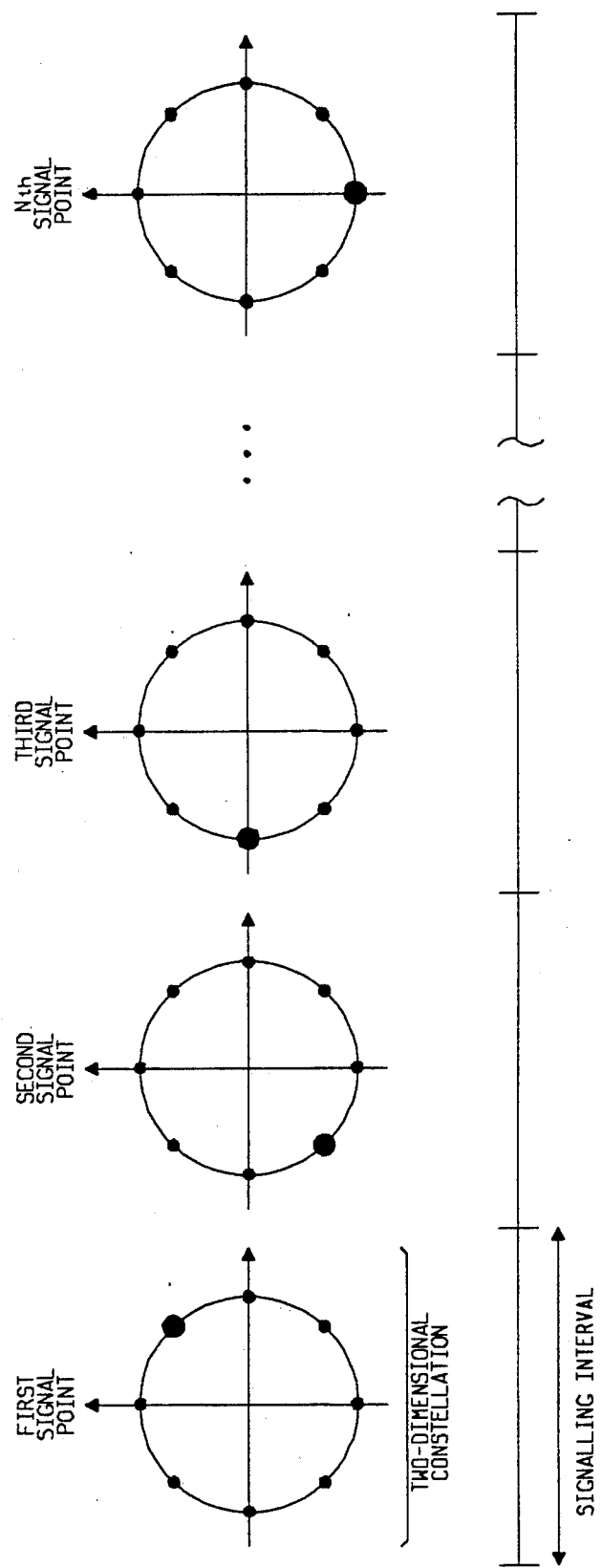
FIG. 2 is a chart which helps explain certain terminology and concepts.

Attention is directed briefly to FIG. 2 which will be helpful in understanding certain of the terminology and concepts used herein. The 2N-dimensional block encoder/mapper generates 2N-dimensional "codewords". Each codeword is comprised of a sequence of N "signal points". Each signal point is a point in a predetermined two-dimensional "constellation"—illustratively shown in FIG. 2 as a phase shift keying constellation having eight signal points, or 8-PSK. This 2N-dimensional codeword is delivered during N "signalling intervals," one signal point in each signalling interval. The assemblage of all 2N-dimensional codewords is referred to as the "2N-dimensional constellation," with each codeword being an "element" of the 2N-dimensional constellation. The 2N-dimensional constellation is also referred to as a codebook or as an alphabet. In the description to follow, each 2N-dimensional codeword is often treated as a concatenation of two constituent N-dimensional elements of a constituent N-dimensional constellation, where the constituent N-dimensional constellation may be arrived at similarly to the 2N-dimensional constellation. This view may be iterated for the N/2-, N/4, etc., dimensional elements and constellations.

Returning to FIG. 1, the N successive 2D signal points output by encoder/mapper 13 on leads 16 in response to each group of $N \times m$ input bits are applied to interleaver 21. The function of the latter is to re-order the signal points $P_n$ so that the signal points belonging to any particular codeword will be separated from one another in time when transmitted. This approach reduces the likelihood that a fade in the channel will affect more than one of the N signal points in a codeword. In preferred embodiments, the block code used in block encoder/mapper 13 has built-in time diversity, to be described in detail hereinbelow, and this time separation of the signal points greatly enhances the ability of such a code to accurately recover the transmitted data, as will also be described. Furthermore, in accordance with a feature of the invention, the block code and the interleaver re-ordering algorithm are chosen jointly so as to yet further enhance this ability.

Finally, the re-ordered signal points $Q_n$ output by the interleaver on leads 24 are applied to modulator 25 whose output, in turn, is applied to fast-fading channel 30. Modulator 25 is described more fully hereinbelow.

In the receiver, demodulator 41 and deinterleaver 44 perform the inverse functions of modulator 25 and interleaver 21, respectively. Accordingly, the output of the latter, on leads 45, is the received, but channel-corrupted sequence of signal points, $\tilde{P}_n$, corresponding to the sequence of signal points appearing on leads 16 at the output of encoder/mapper 13. These are applied to block decoder 51 which recovers and provides, on leads 53, the originally transmitted input data. In accordance with a feature of the invention, as described more fully hereinbelow, block decoder 51 illustratively operates on the basis of so-called "soft decisions" similar to the maximum-likelihood decoder conventionally used for trellis-coded signals in AWGN environments.

At this point, it will be useful to explain the concept of time diversity coding in the context of a first particular illustrative block-code modulation scheme—referred to as Code I—that may be implemented in the illustrative embodiment of FIG. 1.

Figures 3, 4, 5:
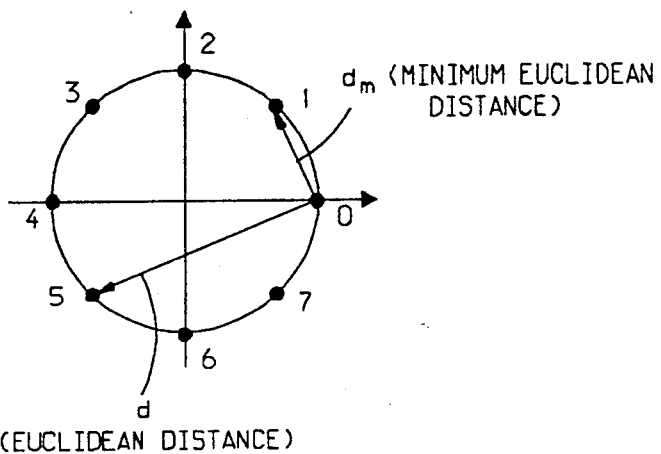
FIG. 3 shows an 8-PSK constellation which forms the basis of a number of the block codes disclosed herein.
FIG. 4 depicts a codebook for a first block-coded modulation scheme in accordance with the invention.
FIG. 5 illustrates the operation of the interleaver shown in FIG. 1 with respect to the first block-coded modulation scheme.

In particular, an 8-PSK signal constellation, as shown in FIG. 3, is illustratively used in implementing a four-dimensional (4D) code, meaning that each codeword generated by the code is comprised of two 2D points of the 8-PSK constellation. Those points are transmitted in respective signalling intervals. The eight points of the constellation are labelled 0 through 7. In this case, the parameters m and r are each equal to 1.5 and, of course, N=2. Thus, block encoder/mapper 13 generates a 3-bit word in each of two successive signalling intervals, each such word identifying, by its bit values, a particular one of the signal points 0 through 7.

The encoding/mapping of the $(N \times m) = 3$ bits input to block encoder/mapper 13 on leads 11 into codewords on leads 16 is shown in the table of FIG. 4 wherein each 3-bit pattern in parentheses denotes the values of the (m+r=) 3 encoded bits and is simply the binary version of the decimal label of its associated signal point. There are $2^3 = 8$ bit patterns, and hence 8 codewords. Notationally, each codeword is referenced hereinafter in the form (x,y) where x and y are, respectively, the first and second signal points comprising the codeword.

Significantly, each of the codewords of Code I differs from any other codeword in both of the constituent 2D points. Thus, for example, neither the first nor the second signal point of the codeword (0,0) is the same as the first or second signal point of any other codeword. The significance of this property may be understood by considering the case when the amplitude of one of the two constituent signal points is so severely attenuated due to a channel fade that the information carried by it is completely lost. It is nonetheless possible to recover that information as long as the other constituent signal point of the codeword has been accurately recovered. In particular, if the first signal point of a recovered codeword is "3" whereas the second signal point is lost, the transmitted codeword can nonetheless be determined to have been (3,7) because no other codeword has "3" as its first signal point. (This analysis is an oversimplification of how the decoding process is preferably carried out, but is useful for purposes of explanation.)

Thus it is seen that this code provides built-in enhanced immunity to fade-induced transmission errors via the mechanism of time diversity. That is, information about each input data bit appears redundantly in the time domain within the coded signal. Thus, for example, information about each of the three bits of the input bit pattern 010 appears both in the first signal point "3" and in the second signal point "7" of the corresponding codeword (3,7).

In general, a code is said to have X-fold time diversity, where X is an integer greater than unity, if each codeword, which is comprised of an ordered sequence of signal points, differs from each other codeword at at least X signal point positions. It will thus be appreciated that Code I has two-fold built-in time diversity. There are, indeed, a number of ways in which the signal points of FIG. 3 can be combined into a codebook of 4D codewords exhibiting two-fold built-in time diversity. Advantageously, however, the one shown in FIG. 4 has the further advantage of maximizing the minimum squared Euclidean distance between codewords (given the requirement of two-fold time diversity), which further enhances the error immunity of the overall coding scheme. That distance is "4" for this code.

It is important at this point to emphasize that what is being described is a coded modulation scheme. By this meant a scheme in which, (a) in order to reduce the signal bandwidth requirement resulting from the introduction of the redundant bits, the size of the signal constellation is increased to more than $2^m$ signal points and (b) the block encoding and constellation mapping are interdependent. This is in sharp contrast to conventional block coding schemes in which (a) the introduction of the redundant bits is accommodated by expanding the signal bandwidth and (b) the block coding and constellation mapping bear no relationship to one another.

More specifically, it is appropriate at this point to compare (a) a code embodying the principles of the present invention which uses signal points from a 2D M-PSK constellation to (b) a scheme which may, for example, block encode the input bits using, for example, a Reed-Solomon or other block code and then transmit the resulting encoded bits as a sequence of signal points each taken from the same 2D M-PSK constellation. In such a case, the resulting ensemble of sequences of transmitted signal points may have some of the attributes of a code embodying the principles of the present invention, such as X-fold time diversity and some coding gain. Any such approach, however, would not be concerned with the minimum Euclidean distance between the transmitted sequences of signal points, as is the case with the present invention. As a result, the minimum squared Euclidean distance between the transmitted sequences of signal points may be as small as a metric herein defined as the "absolute minimum squared Euclidean distance" associated with the alphabet in question. That metric is given by the minimum squared Euclidean distance between any pair of signal points of the 2D M-PSK constellation multiplied by the diversity parameter "X". Thus, for example, the absolute minimum squared Euclidean distance of a 4D code having 2-fold time diversity and using the 2D 8-PSK constellation of FIG. 3 is 1.17, which is the minimum squared Euclidean distance between the codewords of the 4D code comprised of the codewords, (0,0), (1,1), (2,2) ... (7,7). Codes embodying the present invention, by contrast, have a minimum squared Euclidean distance between the transmitted sequences of signal points, i.e., between the codewords, which is greater than the aforementioned absolute minimum squared Euclidean distance. For Code I, for example, which also has two-fold diversity and also uses the constellation of FIG. 3, the minimum squared Euclidean distance between codewords is 4.

A further distinction is that conventional block encoding approaches typically use the same constellation that would be used by their uncoded counterparts. Thus, for example, to transmit (integer) m information bits/signalling interval in an uncoded system, then the constellation used would have $2^m$ modulated signal points. Even if r redundant bits/signalling interval were introduced by the conventional block code, the same constellation would still be used and the band rate would be increased by a factor of $(m+r)/m$ in order to accommodate these redundant bits. By contrast, coded modulation approaches, such as the present invention, accommodate at least some of the redundant bits by expanding the size of the constellation to have more than $2^m$ modulated signal points.

Furthermore, there are a number of ways in which the input bit patterns can be assigned to the various codewords in FIG. 4. Advantageously, however, the particular assignment scheme shown in FIG. 3 has the further advantage of reducing the number of bit errors that occur when the transmitted codeword is decoded incorrectly. Specifically, a Gray coding type of scheme is used to assign the input bit patterns to the codewords. Assume that the second of the two signal points of a codeword may be lost and the information bits will be recovered based solely on the first received signal point. Now note in FIG. 4 how codewords whose first signal point are the closest to each other in Euclidean distance are assigned to bit patterns which differ in only one bit position. The underlying concept is that the signal points that are closest to one another are the ones that are most likely to be confused with one another. This being so, the adoption of the aforementioned Gray coding type of scheme for assigning the bit patterns assures that the minimum number of bit errors are associated with such most-likely-to-occur decoding errors. Thus since signal points 0 and 1 have the minimum distance between them, the bit patterns "000" and "001" respectively assigned to them differ in only one bit position. (It is not possible with this particular code to simultaneously provide such enhanced error correction capability for an assumed fading of the first signal point, but some overall advantage is nonetheless achieved by treating only one case.) Finally, it may be noted that this Gray coding concept is used whenever, and to the extent, possible in the other codes to be described herein although specific mention thereof will not be made herein.

It will be appreciated that if a particular one signal point is lost due to fading, there is a significant likelihood that time-adjacent signal that is points may also be lost. Therefore, in accordance with a principle known in the art, the error immunity afforded by the built-in time diversity of the code can be enhanced by time-separating the two signal points of each codeword so that it is less likely that the two points of the codeword will fade concurrently. It is to this end that the signal points $P_n$ on leads 16 of FIG. 1 are applied to interleaver 21.

Specifically, interleaver 21 takes in and stores a frame of J codewords, graphically depicted in FIG. 5 as being stored in respective rows of a storage matrix maintained within the interleaver. At the point in time depicted in the figure, signal points $P_1$ and $P_2$ of a first codeword are stored in the first row, signal points $P_3$ and $P_4$ of a second codeword are stored in the second row, etc. In the most straightforward type of implementation, the interleaver may wait until all J of the codewords have been read in. It then may read out the signal points that make up the codewords on a column-by-column basis, i.e., first the odd-numbered signal points $P_1$, $P_3$, ..., $P_{2J-1}$, and then the even-numbered signal points $P_2$, $P_4$, ..., $P_{2J}$. (In more efficient implementations, it may be possible for the interleaver to begin reading out the odd-numbered signal points before all J codewords have been read in, as long as enough codewords have been read in to assure a synchronous flow of signal points on leads 24.) Note that the signal points at corresponding signal point positions of the codewords within the frame are now grouped together. That is, for $i = 1,2, \ldots, N$, the respective $i^{th}$ signal points of the codewords of a frame are arranged in respective groups. Thus, as desired, the two signal points of each codeword, appearing in a re-ordered succession on interleaver output leads 24, are now advantageously quite separated in time—specifically by J signalling intervals. The process obviously repeats for successive frames of J codewords.

Ideally, the effectiveness of the interleaver is maximized when the parameter J is greater than or equal to $\frac{1}{4}$ of the carrier wavelength divided by the minimum vehicle speed of interest multiplied by the signalling rate. (This formula is based on the assumption that there is only a single user per mobile radio channel, as is the case when a frequency-division-multiplexing-access (FDMA) approach is used. The considerations surrounding the case where several users are time-multiplexed onto one channel—the so-called TDMA approach—are treated at a more opportune point hereinbelow.) For particular applications, however, a value of J less than this optimum may have to be used to reduce the transmission delay introduced by the interleaver/-deinterleaver. (This may be necessary to ensure a desired level of data throughput or to avoid unnatural conversational delays that may otherwise be introduced into a conversation.)

Finally, the re-ordered signal points $Q_n$ output by the interleaver on leads 24 are applied to $\pi/M$-Shifted M-DPSK modulator 25, whose carrier phase is shifted from that in the previous signalling interval by $2\pi Q_n/M$ augmented by a constant value of $\pi/M$ radians. In accordance with a feature of the invention, I have recognized that the use of such $\pi/M$-shifted modulation can help to reduce the peak-to-average power ratio and can ameliorate potential timing recovery problems in the receiver.

Moreover, I have recognized that the fact that the transmitted signal points are interleaved advantageously eliminates, in the decoder, the correlation between the noise samples introduced by the M-DPSK demodulating process.

Code I has a bandwidth efficiency of 1.5 bits/signalling interval and a 8.9 (14.3) dB coding gain—relative to, say, an uncoded 4-DPSK scheme having the same information bit rate—for a mobile channel at a 20 (60) miles/hour vehicle speed assuming a bit error rate of $10^{-3}$. These coding gains assume a particular "interleaving length" (given by the interleaving frame size, which is 2J for this case, divided by the signalling rate) of 37 ms, which is dictated by human factors—specifically conversational delay—considerations. These coding gains assume a carrier frequency of about 900 MHz. Hereinafter, the coding gains for other codes are all specified under these conditions.

There will now be presented several alternative block-coded modulation schemes suitable for use in fading channels. These codes, by accepting a somewhat higher degree of decoder complexity, are able to achieve varying degrees of greater bandwidth efficiency and/or coding gain than this first code. (For present purposes, the decoder complexity can be understood to be the number of additions and/or comparisons per information bit that need to be performed in carrying out the decoding process described below.)

Figures 6, 7:
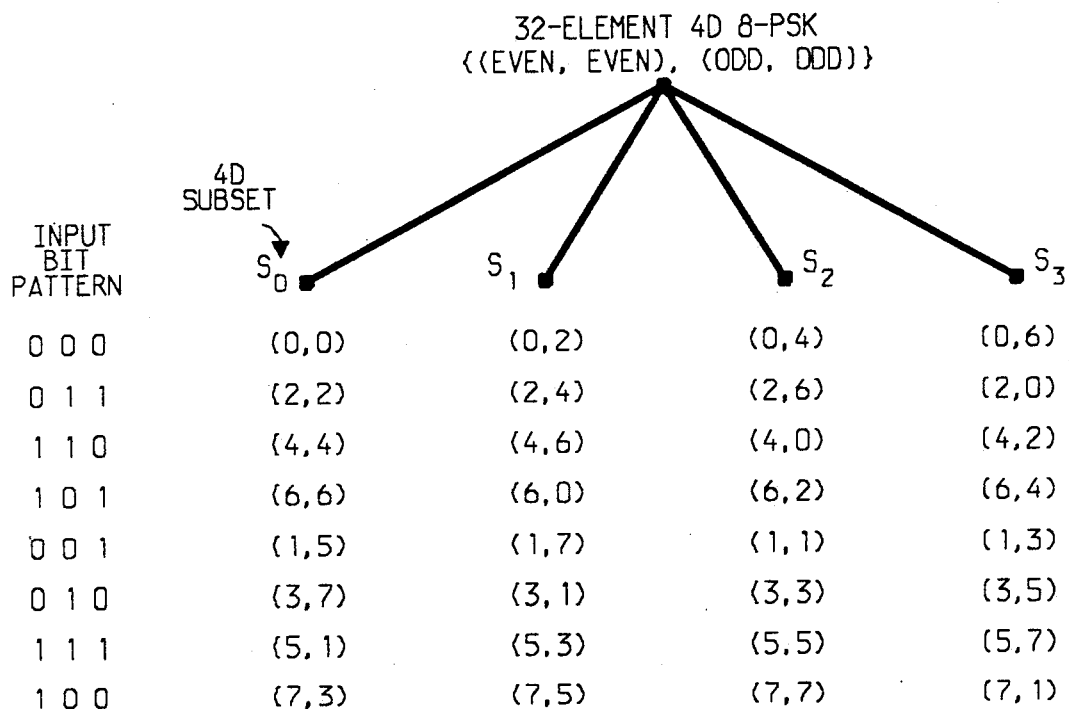
FIGS. 6 and 7 graphically depict a second block-coded modulation scheme in accordance with the invention.
Figure 6:
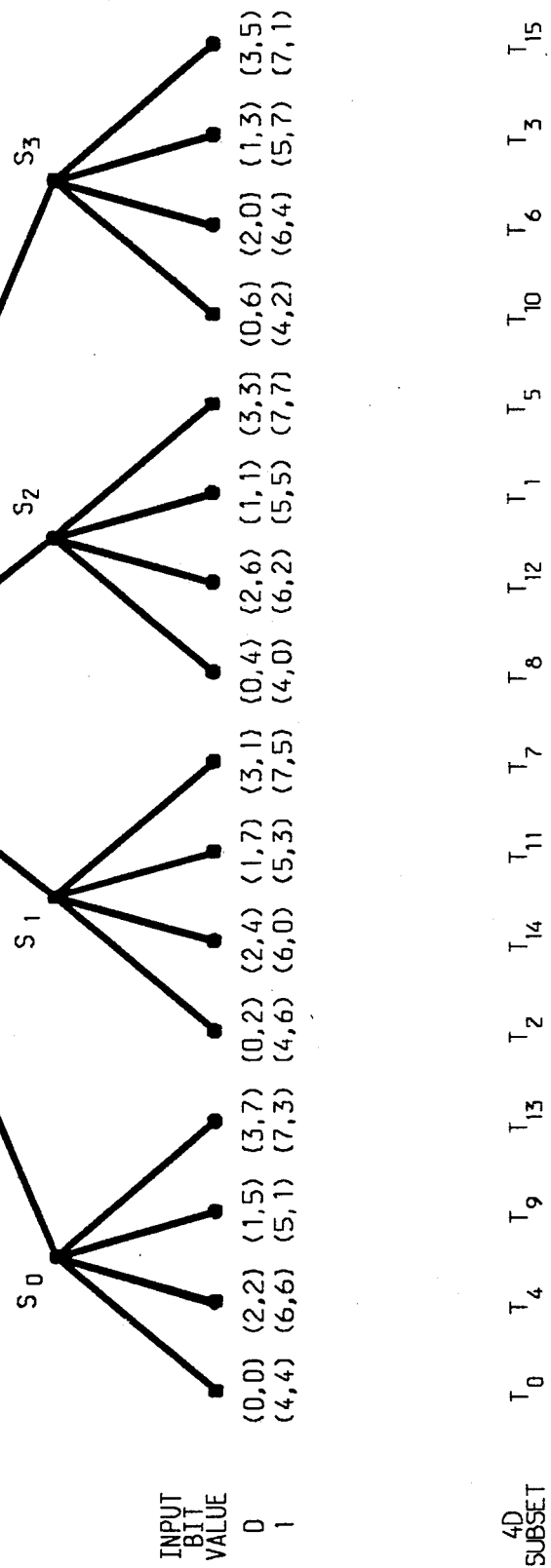

A graphical representation of the second code—referred to as Code II—is shown in FIGS. 6 and 7. This is an eight-dimensional (8D) code which is arrived at by first defining a constituent 4D 8-PSK constellation which is formed by selecting particular elements from a concatenated pair of 2D 8-PSK constellations of the type shown in FIG. 3. The desired 8D constellation is then similarly formed by selecting particular elements from a concatenated pair of the 4D constellations. Each element of this 8D constellation is used as a codeword of this 8D code.

In particular, we select half of the $2^3 \times 2^3 = 64$ possible 4D elements for inclusion in the 4D constellation. They are, illustratively, those elements of the form (a,b) where "a" and "b" are either both even-numbered 2D signal points or both odd-numbered 2D signal points of the 2D 8-PSK constellation shown in FIG. 3. Thus, for example, (0,0) and (5,7) are elements of the 4D constellation but (2,5) and (7,0) are not. As shown in FIG. 6, the 32 elements of the 4D constellation are partitioned into four subsets $S_0, \ldots, S_3$.

Finally, we select one-fourth of the $2^5 \times 2^5 = 1024$ possible 8D elements for inclusion in the 8D constellation. These 256 elements are the elements in the four 4D-subset pairs shown in the codebook of FIG. 7. Specifically, the concatenation of a particular pair of 4D elements is an element of the 8D constellation if and only if the pair of 4D subsets to which the first and second 4D elements belong are, respectively, one of the four patterns shown in FIG. 7. Thus, for example, (0,0,1,5) is an element of the 8D constellation because (a) (0,0) and (1,5) are each elements of 4D subset $S_0$ and (b) the pattern $(S_0, S_0)$ is one of the four allowed patterns of 4D-subset pairs. On the other hand, (0,2,0,6) is not an element of 8D constellation because (a) (0,2) and (0,6) are elements of subsets $S_0$ and $S_3$ and (b) the pattern $(S_0, S_3)$ is not one of the four allowed patterns of 4D-subset pairs.

The above approach to the generation of a particular code can be generally defined as follows: (a) selecting particular concatenations of the signal points of a first constellation to be a first set of elements, (b) grouping the last-defined set of elements into subsets, (c) selecting at least ones of the elements of selected concatenations of the subsets of step (b), each such element being a sequence of elements each taken from a respective subset of the concatenation, and (d) repeating steps (b), (c) and (d) until 2N-dimensional elements are formed, whereby those elements are said 2N-dimensional codewords.

Since the 8D constellation thus formed has $2^8 = 256$ codewords, this code is capable of communicating eight information bits for each 8D codeword. In general, any scheme for assigning the bit patterns to particular codewords could be used. However, in order to reduce the implementation complexity (as well as to take advantage of the possibility of using Gray coding as described above), the encoding/mapping process is split into two phases. As shown in FIG. 7, two bits are used to select a particular 4D-subset pair, while, as shown in FIG. 6, three bits are used to select one of the eight elements in each of the two selected 4D subsets, for a total of six bits used in this phase and, of course, eight bits overall.

Like the first code, this second code exhibits two-fold built-in time diversity, as can be seen from the following. First of all, each of the 4D subsets shown in FIG. 6 itself has two-fold built-in time diversity. (Indeed, it will be observed that 4D-subset $S_0$ taken by itself is the same as Code I described above. Moreover, each of the three other 4D subsets could have been used in its place.) Thus, it is guaranteed that any 4D-subset pair will also exhibit two-fold built-in time diversity. Specifically, it is easily verified that if two 8D elements belong to the same 4D-subset pair, i.e., they come from the same line entry in FIG. 7, then those two 8D elements will differ in at least two—and in some cases, all four—2D signal point positions. In addition, it is also easily verified that if the two 8D elements belong to different 4D-subset pairs, i.e., they come from different line entries in FIG. 7, then those two 8D elements will differ in at least one 2D signal point position in the first constituent 4D element and also in at least one 2D signal point position in the second constituent 4D element. This results from the fact that each 4D subset appears only once in each of the two columns of the codebook of FIG. 7. Thus, as before, any two 8D codewords are guaranteed to differ from one another at least two 2D signal point positions.

Interleaving of this code could be carried out using the interleaving approach described hereinabove wherein the codewords are conceptualized as being read into the interleaver in rows—one codeword per row—and then read out in columns—first the first 2D elements of all the codewords, then the second 2D elements of all the codewords, and so forth. Alternatively, the interleaving approach described hereinbelow in conjunction with Code III of FIGS. 8 and 9 can be used.

There are a number of possible ways to provide two-fold built-in time diversity within the context of a code of the type just described. For example, there are a number of possible ways to (a) select a 4D constellation, (b) select a particular number of subsets into which the selected 4D constellation is to be partitioned, (c) partition the selected 4D constellation into that number of subsets, or (d) select a particular 8D constellation, i.e., particular 4D-subset pairs, for the codebook. Some of these ways are essentially equivalent. For example, the 32-element 4D constellation can be made up of the 32 elements that were not selected in the earlier example. Or, different ones of four 4D-subset pairs meeting the above-discussed criteria can be used for codebook, such as the four pairs $(S_0, S_0)$, $(S_1, S_1)$, $(S_2, S_3)$, and $(S_3, S_2)$. On the other hand, other ways of providing the two-fold built-in time diversity exhibit significant differences in coding gain, bandwidth efficiency, and complexity (as discussed below).

Code II of FIGS. 6 and 7 has a bandwidth efficiency of 2.0 bits/signalling interval and a 8.4 (14.5) dB coding gain for a mobile channel at a 20 (60) miles/hour vehicle speed. Thus it is seen that this code provides greater bandwidth efficiency while achieving essentially the same coding gain as Code I of FIG. 4. This "improvement" is achieved, however, at the cost of somewhat greater complexity and somewhat lesser performance than Code I at speeds below 20 mph (e.g., 5.4 vs. 7.2 at 10 mph).

Turning now to FIGS. 8 and 9, there is depicted another 8D code—Code III—with two-fold built-in time diversity which provides the same bandwidth efficiency (1.5 bits/signalling interval) as Code I, but which achieves significantly greater coding gain, again at a cost of somewhat increased complexity.

As shown in FIG. 8, Code III is constructed by first partitioning each of the four subsets $S_0$, $S_1$, $S_2$ and $S_3$ of the 32-element 4D 8-PSK constellation of FIG. 6 into four finer subsets, each of which is comprised of two elements. The resultant finer subsets are denoted $T_0$ through $T_{15}$. Then, as shown in the codebook of FIG. 9, the concatenation of a particular pair of 4D elements is an element of the 8D constellation if and only if the pair of 4D subsets to which the first and second 4D elements belong are, respectively, one of the sixteen patterns shown in FIG. 9. There are a total of 64 codewords in the 8D constellation. As further shown in FIG. 9, four bits are used to select a particular 4D-subset pair while, as shown in FIG. 8, two bits are used to select one of the two elements in each 4D subset, for a total of six bits overall.

Advantageously, this code has 10.1 (17.1) dB coding gain for a mobile channel at a 20 (60) miles/hour vehicle speed. Thus it is seen that this code provides greater coding gains than either of the two previous codes.

In order to fully appreciate how these greater coding gains come about, it is useful to define a parameter which is (a) easy to compute and (b) provides an indication of the fading channel performance. This parameter, referred to herein as the "minimum squared Euclidian distance at X-fold time diversity" or MDX, is useful in the design of codes having X-fold time diversity for the fading channel and is the minimum squared Euclidean distance between any two codewords which differ from each other at exactly X signal point positions. In general, the larger this distance, the greater the coding gain. Other factors—including, for example, vehicle speed, interleaving length, number of dimensions of the code, and the overall minimum Euclidean distance between any two codewords—also affect the coding gain so that two codes with the same MDX may exhibit somewhat different coding gains. In general, however, there is a high correlation between the MDX and the coding gain—as long as the interleaving length is sufficient to ensure that the signal points of a particular codeword will fade independently. Given the assumed interleaving length of 37 ms and vehicle speed at or above 20 mph, such independent fading is in fact assured for, for example, the 4D and 8D codes thus far described. Thus the MDX of 4, 4, and 8, respectively, for these three codes results in substantially the same coding gains for the first two and a significantly greater coding gain for the third. (Throughout this description, all quoted values of the MDX are calculated assuming an M-PSK constellation with unity radius).

As with the code of FIGS. 6 and 7, interleaving of Code III could be carried out using the interleaving approach described hereinabove. In accordance with the invention, however, the particular way in which the signal points are re-ordered by the interleaver may be matched to the particular block code being used in such a way which, (a) for a given interleaving length—to which the interleaver may be constrained by system considerations, as described above—increases the effectiveness of the interleaver, i.e., the contribution of the interleaving process to the coding gain, or (b) for a given level of coding gain, allows for a shorter interleaving length, thereby possibly meeting system requirements that could not otherwise be met.

Looking at the code of FIGS. 8 and 9, it can be observed that all codewords which differ in only two signal point positions do so either in the first and second signal point positions or in the third and fourth signal point positions. This being so, I have recognized that—following the logic set forth above for the interleaver of FIG. 5—it is advantageous to re-arrange the order in which the columns of signal points are read out of the interleaver—specifically, as shown in FIG. 10, first the first 2D signal points of all the codewords (column A of FIG. 10), then the third 2D signal points of all the codewords (column C), then the second (column B), and then the fourth (column D). This approach advantageously separates the first and second signal points of any codeword by 2J signalling intervals instead of J signalling intervals and, similarly, the third and fourth signal points.

In the more general case, it will be appreciated that various re-ordering schemes can be used within the interleaver—depending on the structure of the codewords—in order to maximally separate those signal points of the codewords which differ in X signal point positions and thus give rise to the desired X-fold built-in time diversity. More formally stated, given particular ones of the codewords of the alphabet that differ in exactly X signal point positions, and which have an inter-codeword distance MDX, and denoting two of those X signal point positions as the $k^{th}$ and $q^{th}$ signal point positions, the interleaver operates to generate a re-ordered succession of the signal points of the codewords of each frame in such a way that the signal points at those $k^{th}$ and $q^{th}$ signal point positions are separated by more than J signal points in the re-ordered succession. Given this general principle, it is not necessary to further describe the interleaver structure that may be advantageously used in conjunction with the various other codes to be described hereinbelow.

Figure 11:
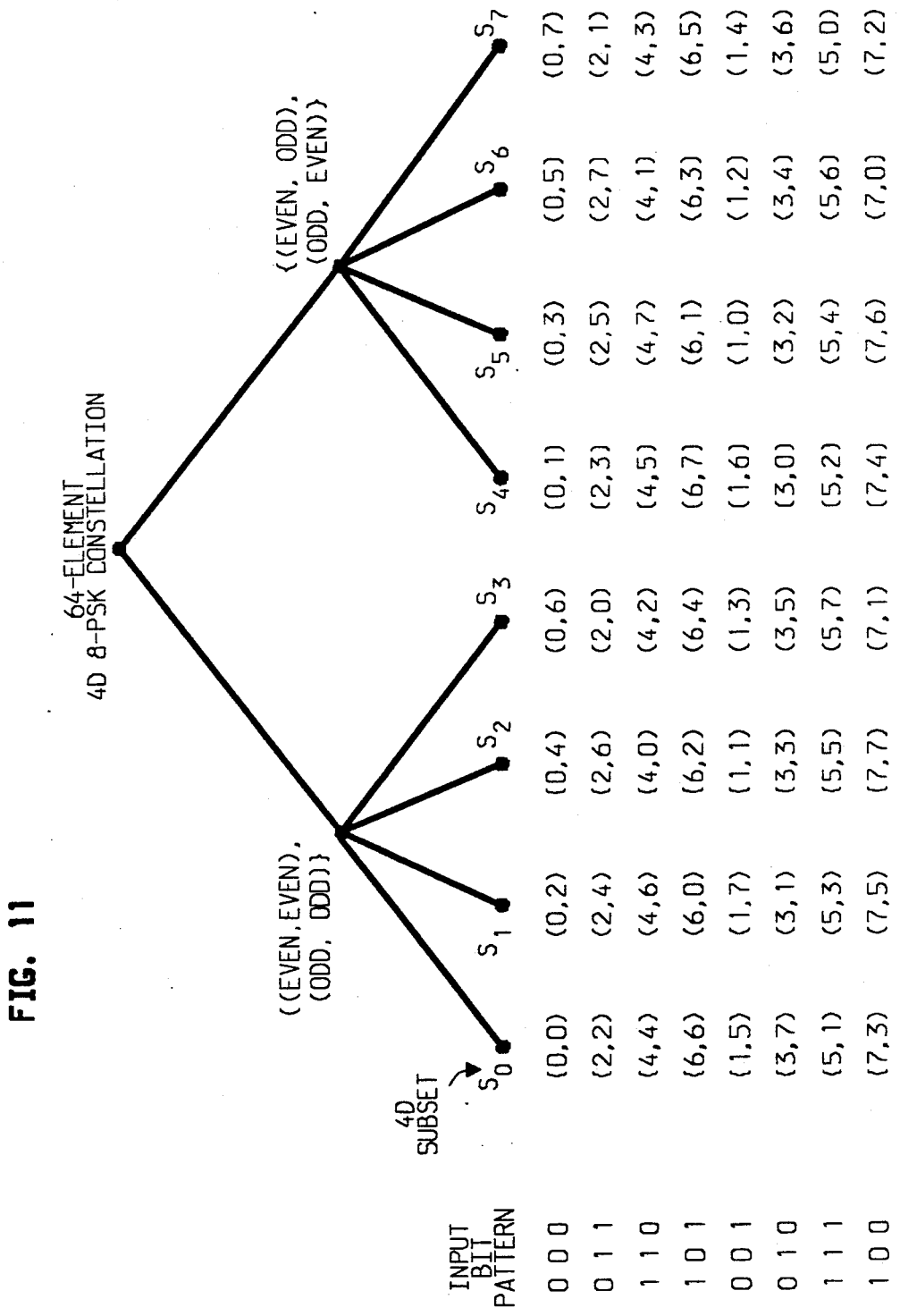
FIGS. 11–13 graphically depict a fourth block-coded modulation scheme in accordance with the invention.
Figures 12, 13:
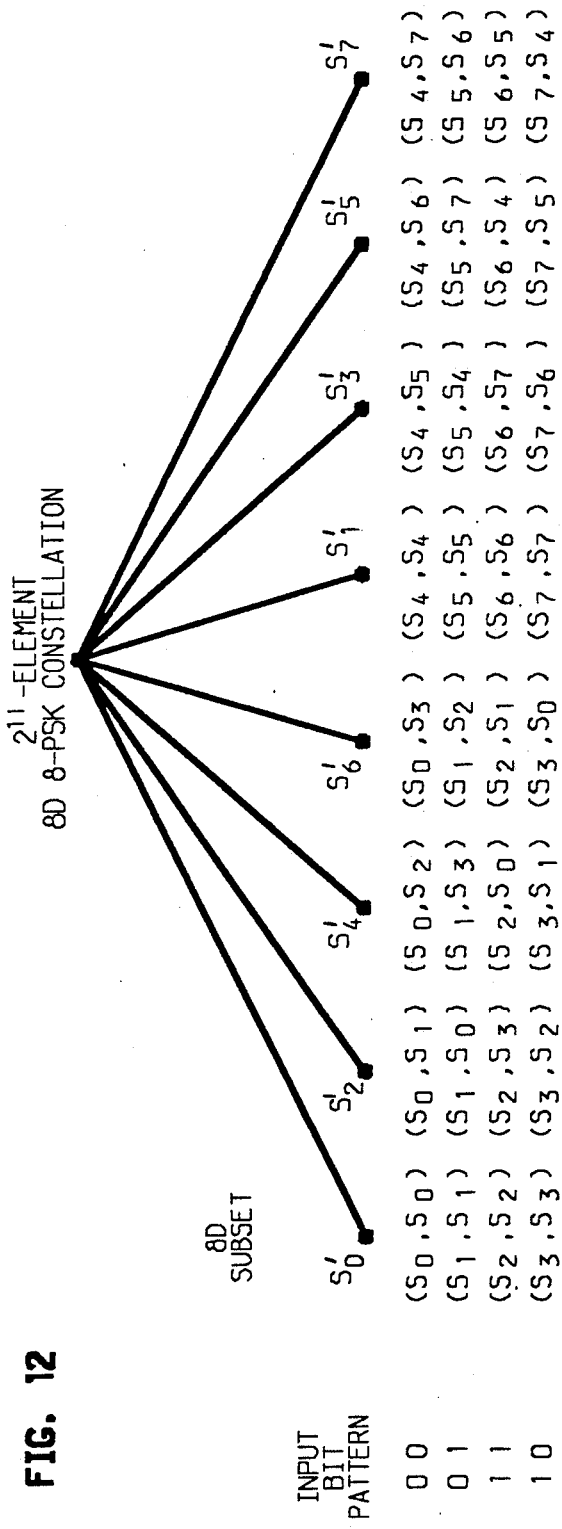

Turning now to FIGS. 11-13, there is a 16D code—Code IV—with two-fold built-in time diversity which has the same MDX (i.e., 4) as the Codes I and II. However, the 16D code provides significantly higher bandwidth efficiency (2⅜ bits/signalling interval) than the codes described to this point at the expense of less coding gain (for the same interleaving length). The decoder complexity is also somewhat greater than in the codes already described.

We begin by first defining a 64-element constituent 4D 8-PSK constellation which is formed from a concatenated pair of 2D 8-PSK constellations of FIG. 3. The 4D constellation is then partitioned into eight subsets $S_0$ through $S_7$ as shown in FIG. 11 (It may be noted that subsets $S_0$ through $S_3$ are, illustratively, the same four subsets shown in FIG. 6.) A constituent 8D constellation is then formed by selecting particular elements from a concatenated pair of the 4D constellations. Specifically, we select 32 of the 64 possible 4D-subset pairs to make up the 8D constellation. The latter, which is comprised of $2^{11}$ elements, is partitioned into eight subsets, each comprising four of the 4D-subset pairs, as shown in FIG. 12. The eight 8D subsets are denoted as $S_0', S_1', \ldots, S_7'$.

Finally, we select one-eighth of the $2^{11} \times 2^{11}$ possible 16D elements for inclusion in the 16D constellation. These $2^{19}$ elements are the elements in the eight 8D-subset pairs shown in the codebook of FIG. 13. Specifically, the concatenation of a particular pair of 8D elements is an element of the 16D constellation if and only if the pair of 8D subsets to which the first and second constituent 8D elements belong are, respectively, one of the eight patterns shown in FIG. 13.

As further shown in FIGS. 11-13, three bits are used to select a particular 8D-subset pair; two bits are used to select a particular 4D-subset pair from each of the two selected 8D subsets, for a total of 4 bits at this level; three bits are used to select a particular pair of 2D points from each of the four selected 4D subsets, for a total of 12 bits at this level and a total of 19 bits overall. Since each codeword extends over eight signalling intervals, the bandwidth efficiency is 19/8=2⅜ bits/signalling interval.

This code has 6.8 (13.9) dB coding gain for a mobile channel at a 20 (60) miles/hour vehicle speed.

To this point, the various codes have been described using a quasi-graphical approach. Alternatively, the codes can each be described in terms of a few simple Boolean expressions which define the operation of a number of logical components which comprise the block encoder/mapper, e.g., block encoder/mapper 13 of FIG. 1. This latter approach will now be used to describe the next code because the graphical approach for that code is complicated to represent. It will be appreciated that any of the prior codes could also have been described using this latter approach. Conversely, the Boolean expressions set forth below can be used to construct a quasi-graphical representation as was done for the other codes.

In particular, this next code is another 16D 8-PSK code—Code V—with two-fold built-in time diversity and which has the same MDX (i.e., 8) as Code III of FIGS. 8-9. Although this code has neither the highest bandwidth efficiency nor the largest coding gain, it does advantageously afford a useful combination of both of these parameters. Specifically, it has a coding gain of 8.5 (20 mph) and 16.7 (60 mph) and a bandwidth efficiency of 2.0 bits/signalling interval. The decoder complexity is the greatest of all the codes described.

Figure 14:
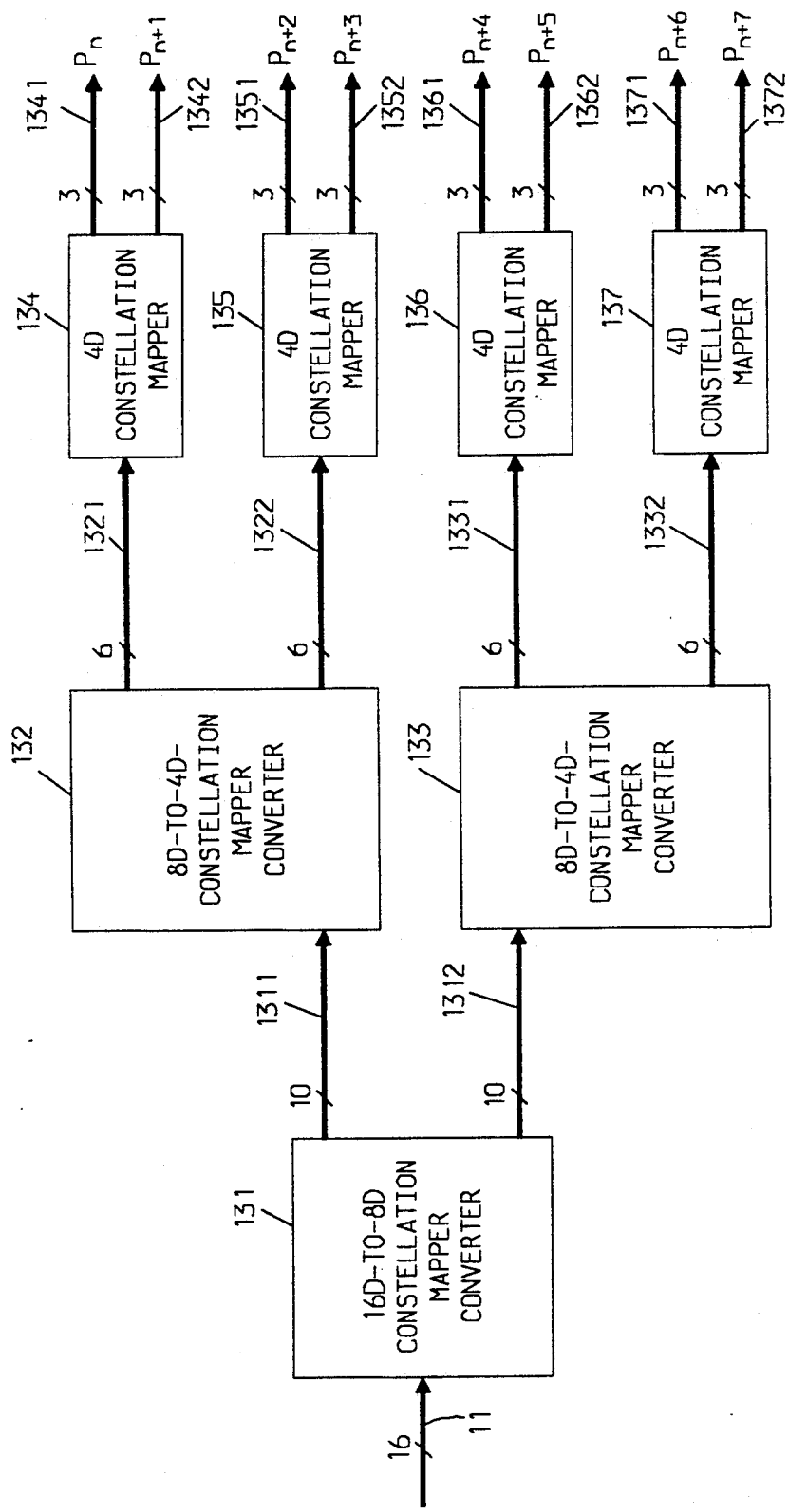
FIG. 14 is a block diagram of the encoder/mapper of FIG. 1 for a fifth block-coded modulation scheme in accordance with the invention.

As shown in FIG. 14, the 16 input bits accumulated over eight signalling intervals on leads 11 of FIG. 1 are applied to circuitry which, ultimately, identifies by three bits on each of leads 1341-2, 1351-2, 1361-2 and 1371-2 the particular eight 2D points on leads 16 of FIG. 1 which comprise the 16D codeword associated with the 16 input bits. (Note that in FIG. 14 (as well as in FIGS. 15 and 21 described below), the number of bits shown as being carried on a particular set of leads, e.g. leads 11, is the number of bits aggregated over N signalling intervals. This is in contrast to, for example, FIG. 1 in which the number of bits shown as being carried by a particular set of leads is the average number of bits per signalling interval.) As with the codes already (graphically) described, the mapping is carried out in stages. In particular, the 16 bits on leads 11 are applied to 16D-to-8D-constellation-mapper converter 131, which provides ten bits on each of its output leads 1311 and 1312. Each of those ten bits is associated with a particular element of a constituent 8D constellation. Only particular combinations of those 8D elements appear on leads 1311-12. As will become even clearer hereinbelow, this restriction corresponds to the restriction in, for example, Code IV of FIGS. 11–13 that the 16D constellation is comprised of only certain selected 8D-subset pairs.

At the next stage, the bits on leads 1311-12 are applied to respective 8D-to-4D-constellation-mapper converters 132 and 133. Converter 132, for example, provides six bits on each of its output leads 1321 and 1322. Each of those six bits is associated with a particular element of a constituent 4D constellation and only particular combinations of those 4D elements appear on leads 1321-2, again corresponding to the way in which Code IV is constructed. Converter 133 is identical to converter 132. Depending on the implementation, only one such converter may be used. The two groups of ten bits each on leads 1311 and 1312 would then be delivered to this single converter successively.

At the final stage, the bits on leads 1321-2 and 1331-2 are applied to respective 4D-constellation-mappers 134-137. Mapper 134, for example, provides three bits on each of its output leads 1341 and 1342. Each of those three bits is associated with a particular point of the 8-PSK constellation of FIG. 3 and all $2^6 = 64$ combinations of the two 2D points are used. Mappers 134–137 are identical. As is the case of converters 132 and 137, only one such mapper may be used.

Figure 15:
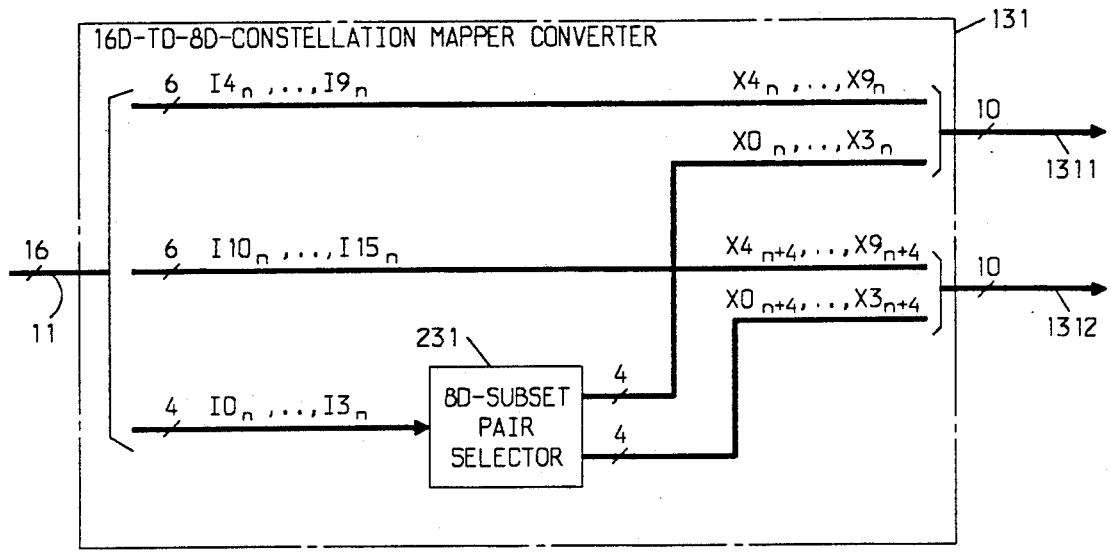
FIGS. 15–17 show the details of various parts of the encoder/mapper of FIG. 14.
Figure 16:
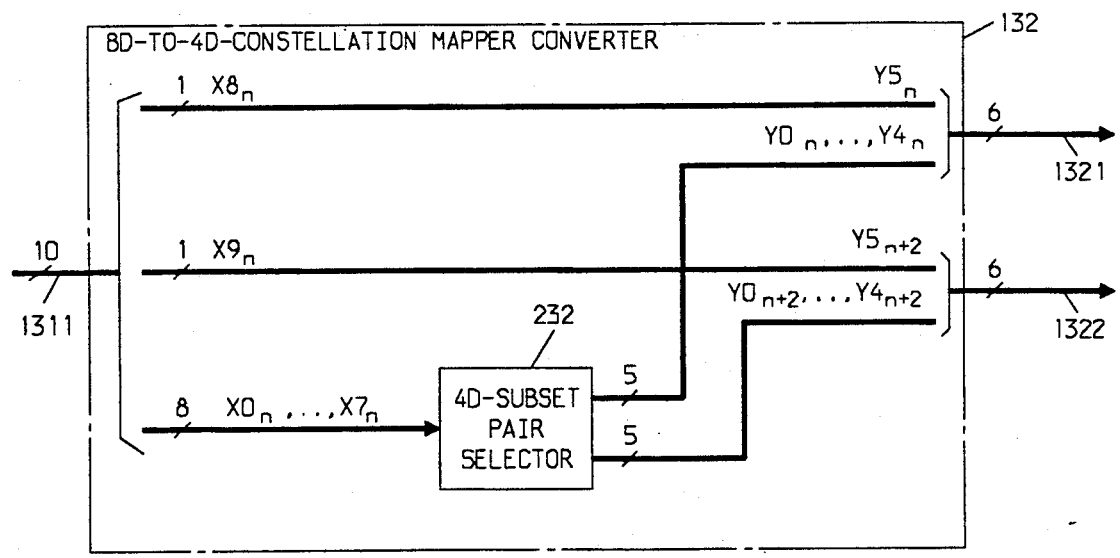
Figure 17:
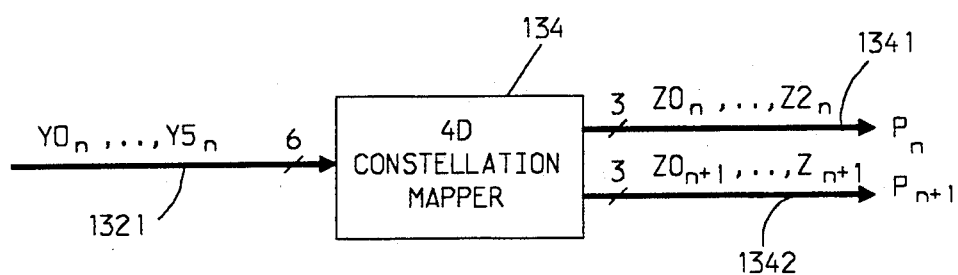

Illustrative embodiments of 16D-to-8D-constellation-mapper converter 131, 8D-to-4D-constellation-mapper converter 132 and 4D mapper 134 are shown in FIGS. 15-17, respectively.

Referring first to FIG. 15, the sixteen bits on leads 11 are divided into three groups. The first group is comprised of four bits $I0_n$ through $I3_n$ which are applied to 8D-subset pair selector 231. The second (third) group, comprised of six bits $I4_n$ through $I9_n$ ($I10_n$ through $I15_n$) simply pass through to become output bits $X4_n$ through $X9_n$ ($X4_{n+4}$ through $X9_{n+4}$). The output bits of selector 231 are two groups of four bits each—$X0_n$ through $X3_n$ and $X0_{n+4}$ through $X3_{n+4}$. The ten bits with the subscript "n" will ultimately be used to identify the first constituent 8D element of the codeword, which is comprised of the four 2D signal points $P_n$ through $P_{n+3}$ (FIG. 1). Similarly, the ten bits with the subscript "n+4" will ultimately be used to identify the second constituent 8D element of the codeword, which is comprised of the four 2D signal points $P_{n+4}$ through $P_{n+7}$. In particular, the bits $X0_n$ through $X3_n$ identify a particular one of sixteen 8D subsets, while the bits $X4_n$ through $X9_n$ ultimately identify a particular one element of that 8D subset. Likewise for the ten bits with subscript "n+4". Selector 231 provides its output bits in accordance with the following Boolean expressions:

$$X3_{n+4} = I3_n$$
$$X2_{n+4} = I1_n$$
$$X1_{n+4} = I0_n$$
$$X0_{n+4} = I2_n \oplus I1_n \oplus I0_n$$

$$X3_n = I3_n$$
$$X2_n = I1_n$$
$$X1_n = I0_n$$
$$X0_n = I2_n$$

The ten bits $X0_n$ through $X9_n$ are applied to converter 132. As shown in FIG. 16, these bits are also divided into three groups. The first group is comprised of the eight bits $X0_n$ through $X7_n$ which are applied to 4D-subset pair selector 232. The second (third) group, comprised of the single bit $X8_n$ ($X9_n$), simply passes through to become output bit $Y5_n$ ($Y5_{n+2}$). The output bits of selector 232 are two groups of five bits each—$Y0_n$ through $Y4_n$ and $Y0_{n+2}$ through $Y4_{n+2}$. The six bits with the subscript "n" will be used to identify the first constituent 4D element of the first constituent 8D element of the codeword, which is comprised of the two 2D signal points $P_n$ and $P_{n+1}$. Similarly, the six bits with the subscript "n+2" will be used to identify the second constituent 4D element of the first constituent 8D element of the codeword, which is comprised of the two 2D signal points $P_{n+2}$ and $P_{n+3}$. The bits $Y0_n$ through $Y4_n$ identify a particular one of 32 4D subsets, while the single bit $Y5_n$ identifies a particular one element of that 4D subset. Likewise for the six bits with subscript "n+2". Selector 232 provides its output bits in accordance with the following Boolean expressions:

$$Y4_{n+2} = X3_n$$
$$Y3_{n+2} = X4_n \oplus X1_n$$
$$Y2_{n+2} = X5_n \oplus X2_n$$
$$Y1_{n+2} = X6_n$$
$$Y0_{n+2} = X7_n \oplus X6_n \oplus X0_n$$

$$Y4_n = X3_n$$
$$Y3_n = X5_n$$
$$Y2_n = X4_n$$
$$Y1_n = X6_n$$
$$Y0_n = X7_n$$

The six bits $Y0_n$ through $Y5_n$ are applied to mapper 134 as shown in FIG. 17. The output bits of mapper 134 are two groups of three bits each—$Z0_n$ through $Z2_n$ and $Z0_{n+1}$ through $Z2_{n+1}$. The three bits with the subscript "n" define 2D signal point $P_n$. Similarly, the three bits with the subscript "n+1" define 2D signal point $P_{n+1}$. Mapper 134 provides its output bits in accordance with the following Boolean expressions:

$$Z2_{n+1} = Y3_n \oplus Y5_n$$
$$Z1_{n+1} = Y2_n \oplus Y1_n$$
$$Z0_{n+1} = Y0_n \oplus Y4_n$$

$$Z2_n = Y5_n$$
$$Z1_n = Y2_n$$
$$Z0_n = Y0_n$$

Figure 18:
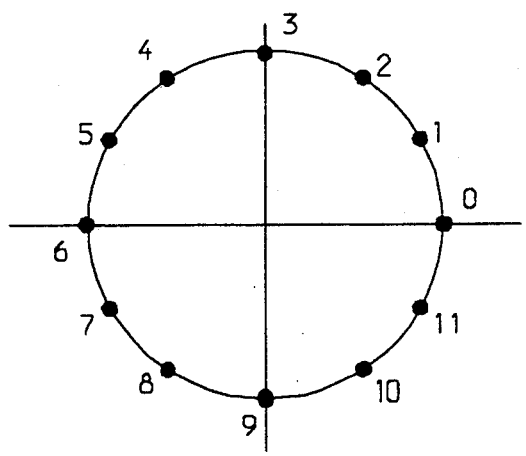
FIG. 18 shows a 12-PSK constellation which forms the basis of a sixth block-coded modulation scheme in accordance with the invention.
Figures 19, 20:
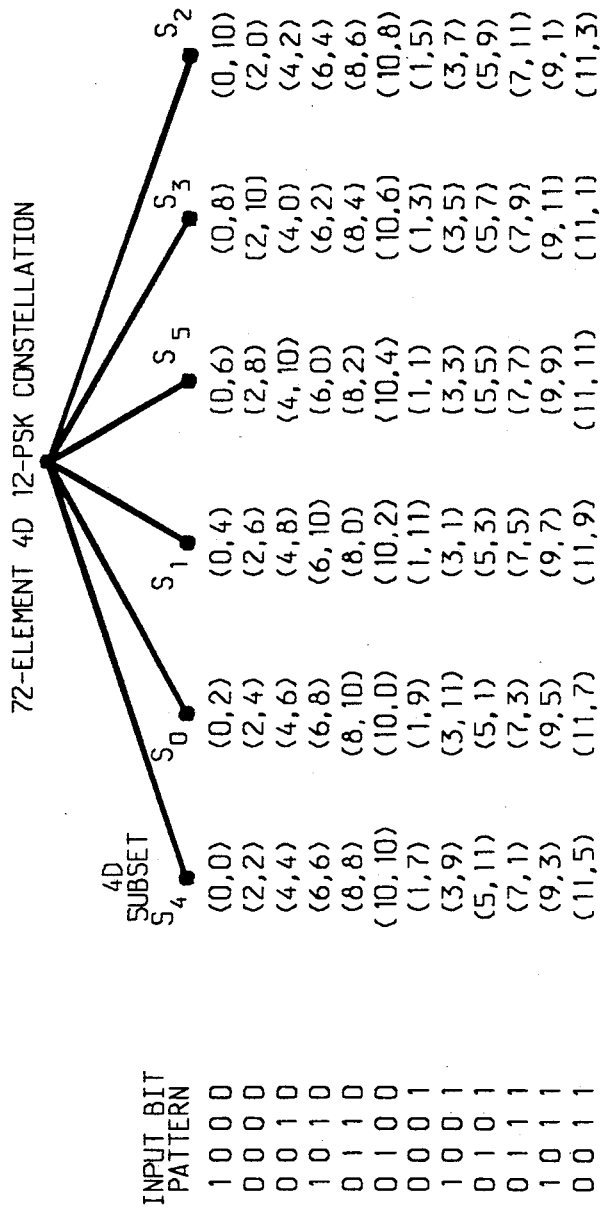
FIGS. 19-20 graphically depict the sixth block-coded modulation scheme.

A graphical representation of a sixth code—Code VI—is shown in FIGS. 18-20. This is another 8D code with two-fold built-in time diversity which achieves a higher bandwidth efficiency—$2\frac{5}{8}$ bits/signalling interval—than, for example, Code II of FIGS. 6-7 at the expense of larger M-PSK constellation size of twelve points (M=12) rather than eight and slightly higher complexity and some degradation in the coding gain.

Like the other 8D codes described above, Code VI is arrived at by first defining a 4D constellation which is formed by selecting particular elements from a concatenated pair of 2D constellations. However, as noted above, the 2D constellation is a 12-point constellation—specifically, the 12-PSK constellation shown in FIG. 18. This code is thus unique in that the value of M is other than an integral power of 2. The desired 8D constellation is then similarly formed by selecting particular elements from a concatenated pair of the 4D constellations. Each element of this 8D constellation is used as a codeword of this 8D code.

In particular, we select half of the $12^2 = 144$ possible 4D elements for inclusion in the 4D constellation. As in Code II of FIGS. 6-7, they are, illustratively, those elements of the form (a,b) where "a" and "b" are either both even-numbered 2D signal points or both odd-numbered 2D signal points of the 2D 12-PSK constellation shown in FIG. 18. As shown in FIG. 19, the 72 elements of the 4D constellation are partitioned into six subsets $S_0, \ldots, S_5$ of 12 elements each.

Finally, we select 768 of the $72^2 = 5184$ possible 8D elements for inclusion in the 8D constellation, the reason for using 768 being explained hereinbelow. These 768 elements are particular ones of the elements in the six 4D-subset pairs shown in FIG. 20. Note a difference here between this code and all the others previously described. In the other 8D codes, all of the elements of each selected 4D-subset pair are used, i.e., are codewords. In the case of FIG. 20, however, this approach would result in 144 codewords from each 4D-subset pair, for a total of 864. However, only 768 codewords are desired. Hence in this case, only 128 elements of each 4D-subset pair of FIG. 20—selected as described below—are used.

It will be appreciated from the foregoing that ten bits are required to identify a particular codeword. Specifically, three bits are used to select a particular 4D-subset pair (FIG. 20) and, since each such pair has $2^7 = 128$ elements, another seven bits are needed to select a particular codeword. Note, however, that not all possible combinations of those ten bits are allowed, as this would result in 1,024 combinations whereas only 768 codewords are available. Indeed, even if all 144 elements of each 4D-subset pair were included in the code, there would still be an insufficient number of codewords, i.e., $144 \times 6 = 864$. (Although use of all 864 codewords would provide slightly greater bandwidth efficiency, additional processing would be required and additional processing delay would result.)

The task at this point, then, is to provide an easily implemented way of generating, from the stream of input bits, 768 10-bit word patterns for each four signalling intervals. This is illustratively achieved in accordance with a technique which processes 19 bits taken in over eight signalling intervals to generate two 8D codewords, thereby achieving the aforementioned bandwidth efficiency of $19/8 = 2\frac{3}{8}$ bits/signalling interval.

Figure 21:
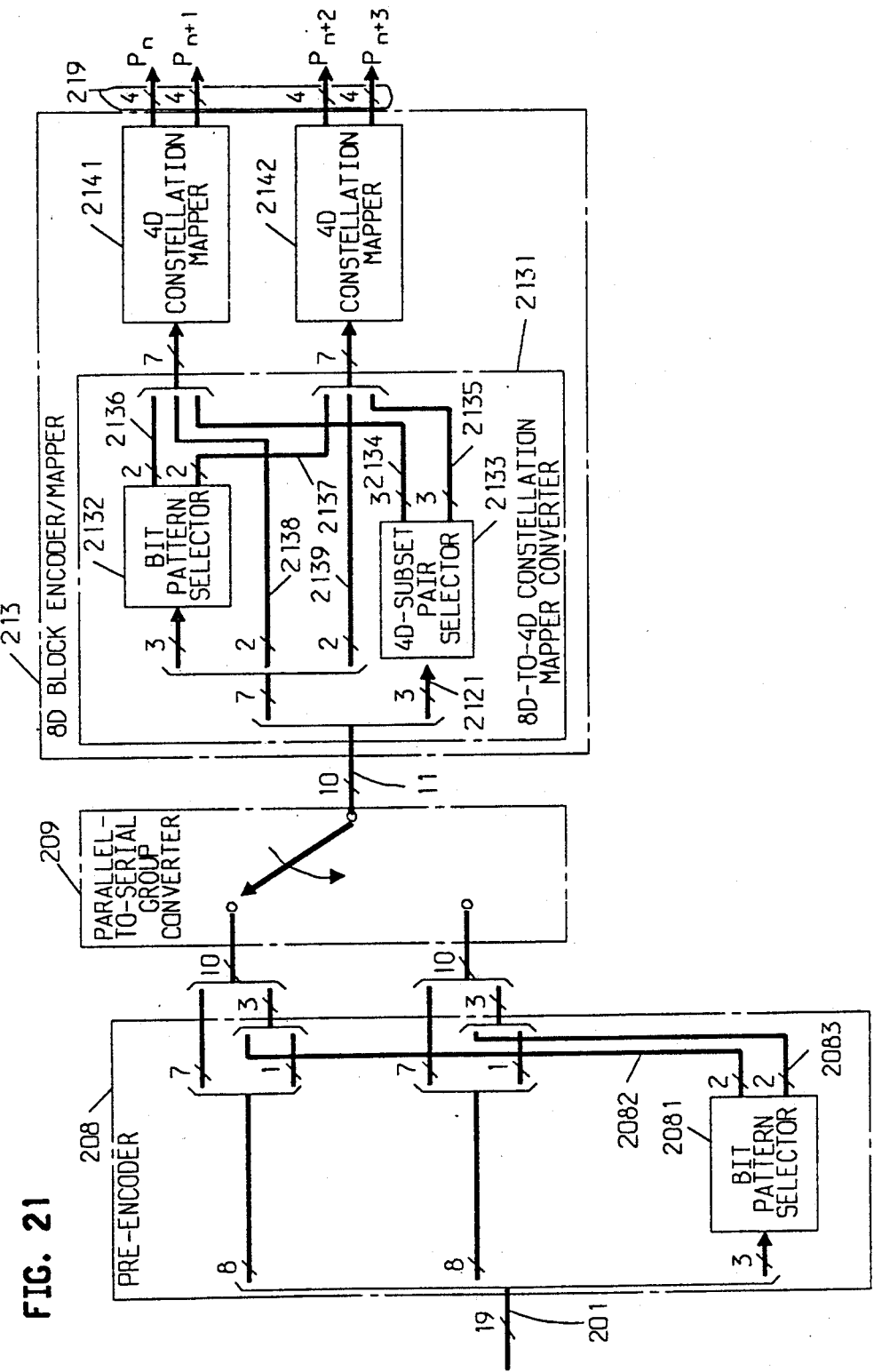
FIG. 21 is a block diagram of circuitry for implementing the sixth block-coded modulation scheme.

Specifically, FIG. 21 shows circuitry which takes in the input bits on input leads 201 and provides the signal points $P_n, \ldots, P_{n+3}$ on output leads 219. This circuitry specifically comprises a pre-encoder 208, parallel-to-serial group converter 209 and block encoder/mapper 213, the latter corresponding to block encoder/mapper 13 of FIG. 1.

The input bits on leads 201 are divided into three groups of 8, 8 and 3 bits, respectively. The two groups of 8 bits simply pass through the pre-encoder. The group of 3 bits is applied to bit pattern selector 2081, which provides on its output leads 2082 and 2083 two groups of 2 bits each. The two bits on leads 2082 can take on one of the three patterns "00", "01" or "10", but not "11". Similarly for the two bits on leads 2083. Additionally, the pattern "10" cannot appear on leads 2082 and 2083 at the same time. There are thus $2^3 = 8$ possible different combinations of the values of the bits on leads 2082 and 2083.

The output bits of pre-encoder 208 are grouped into two groups of ten bits each, which are applied one after the other by parallel-to-serial converter 209 to encoder/mapper 213 in order to identify two successive 8D codewords. To this end, each group of ten bits is divided into a 3-bit group—including the two bits from one of leads 2082 or 2083 and one of the other precoder input bits—and a 7-bit group. The 3-bit group can thus take on $3 \times 2 = 6$ possible patterns, which are the six possible patterns shown in FIG. 20 used to select a particular 4D-subset pair. The 7-bit group is used to select a particular codeword from the selected pair.

Specifically, the 3- and 7-bit groups are applied to 8D-to-4D-constellation-mapper converter 2133 within block encoder/mapper 213. The 3-bit group is applied via lead 2121 to 4D-subset pair selector 2133 which provides on its output leads 2134 and 2135 respective 3-bit words, each of which identifies one of the 4D subsets of the selected pair. The other seven bits are divided into three groups of 3, 2 and 2 bits, respectively. The two groups of 2 bits simply pass through converter 2131. The group of 3 bits is applied to bit pattern selector 2132, which is illustratively identical to bit pattern selector 2081. There are thus three possible combinations of the values of the two bits on output leads 2136 and similarly on leads 2137. The two bits on each of output leads 2136 and 2137 are grouped with one of the two 2-bit groups on leads 2138 and 2139 to provide respective 4-bit words, each of which can assume one of $3 \times 4 = 12$ bit patterns. Each such 12-bit pattern is used to select a particular element from a particular one of the 4D subsets identified by the bits on leads 2134 and 2135. The seven bits on leads 2136, 2138 and 2134 are applied to a 4D constellation mapper 2141, which provides on its output leads the two 2D signal points $P_n$ and $P_{n+1}$ which comprises the first constituent 4D element of the 8D codeword. Similarly, the seven bits on leads 2137, 2139 and 2135 are applied to a 4D constellation mapper 2142, which provides on its output leads the two 2D signal points $P_{n+2}$ and $P_{n+3}$ which comprise the second constituent 4D element of the 8D codeword. 4D-Constellation mappers 2141 and 2142 are identical. As in the case of Code V, only one such mapper may be used.

The assignment of bit patterns to 4D-subset pairs, shown in FIG. 20, and to the elements of each 4D subset, FIG. 19, could be arbitrary. However, the particular assignment scheme shown in FIGS. 19 and 20 ensures that there is no code-originated dc energy in the transmitted signal.

In particular, we begin by recognizing that not every 4D element in any particular 4D subset is used with equal probability. This results from the fact that the bit patterns on 4D constellation mapper 2141 (2142) input leads 2136 and 2138 (2137 and 2139) do not occur with equal probability. Thus, in particular, the four bit patterns "1000", "1010", "1001" and "1011" each occur with probability 1/16, while the other eight bit patterns each occur with probability 3/32. This situation could result in a lack of dc balance in the code if care is not taken in assigning the particular bit patterns to the particular elements of the 4D subsets. In preferred embodiments, however, care is taken to ensure that bit patterns with equal probability are assigned to respective 4D elements in each 4D subset in FIG. 19 in such a way that the sum of the first coordinate of the 4D elements is zero, and similarly for the second, third and fourth coordinates. Consider, for example, the two bit patterns "1000" and "1010", which, as noted above, each have probability of 1/16. Referring back to FIG. 18, and assuming that the 2D signal points lie on a circle of radius "A", then coordinates of the 4D element (0,0) in 4D subset $S_4$—to which the bit pattern "1000" is assigned—are seen to be (A,0) and (A,0). Similarly, the coordinates of the 4D element (6,6) in the same 4D subset $S_4$—to which the bit pattern "1010" is assigned—are seen to be (−A,0) and (−A,0). Applying the above criterion, then, the sum of the first coordinates (A)+−

(−A) is zero, the sum of the second coordinates (0)+(0) is zero, the sum of the third coordinates (A)+(−A) is zero and the sum of the fourth coordinates (0)+(0) is zero.

The above-discussed criterion assures long-term dc balance. Advantageously, short-term dc balance can also be achieved by putting further constraints on the assignment of bit patterns to particular 4D elements across the various 4D subsets, as in FIG. 19, and also to 4D-subset pairs, as in FIG. 20. Note in FIG. 19 that the six 4D elements in different 4D subsets, which all begin with a particular 2D point, are assigned to a particular one bit pattern. Thus, for example, the 4D elements assigned to the bit pattern "0110" all have "8" as their first 2D signal point.

Note further that not every 4D subset is used with equal probability. This results from the fact that the bit patterns on 4D-subset pair selector 2133 input leads 2121 do not occur with equal probability. Thus, in particular, the two bit patterns "100" and "101" each occur with probability of $\frac{1}{8}$, while the other four bit patterns each occur with probability of 3/16. Now note from FIG. 19 that, for every 4D element of subset $S_4$ that has a particular first 2D point, the 4D element that has the same first 2D point and a balancing second 2D point is assigned to subset $S_5$. Thus, for example, since subset $S_4$ includes the 4D elements (1,7) then subset $S_5$ includes the 4D element (1,1). As a result of the foregoing, subset $S_5$ exhibits more "dc balance" with subset $S_4$ than with any other subset.

Similarly, 4D subset $S_0$ exhibits "dc balance" with subset $S_3$, and 4D subset $S_1$ exhibits "dc balance" with subset $S_2$. In preferred embodiments of FIG. 20, care is taken to select the six 4D-subset pairs to form the 8D constellations and to assign the input bit patterns to the selected 4D-subset pairs in such a way that the new "dc balanced" 4D subsets $S_4$ and $S_5$ are used with equal probability of $\frac{1}{8}$ and the other four 4D subsets are used with equal probability of 3/16.

This code has 6.7 (12.1) dB coding gain for a mobile channel at a 20 (60) miles/hour vehicle speed. The MDX of this code is 2 and, indeed, the coding gain of this code is the smallest of all the codes described herein.

Returning now to FIG. 1, the preferred structure for block decoder 51 will now be described. The same basic type of structure can be used for all of the codes described herein. The decoding process for the assumed type of channel and modulation/demodulation—e.g., a mobile channel using M-DPSK with non-coherent detection—is similar to that which would be used for an AWGN channel. This approach may not be optimal in that the impairments in the mobile channel and the non-coherent M-DPSK demodulating process introduce noise which does not fit the AWGN model. This approach, however, has the advantage of being simple to implement and will exhibit at least close-to-optimal performance.

The decoding proceeds by examining each 2D point of a particular received signal corresponding to a transmitted 2N-dimensional codeword. In particular, so-called "2D point metrics" are computed for each received 2D point by measuring the squared Euclidean distance between the received point and all possible transmitted 2D points. In performing this calculation, a particular radius of the transmitted constellation is assumed and the receiver is provided with an automatic gain control (not shown) which is set so as to provide an output constellation whose long term average radius is at least approximately equal to the radius assumed in the decoding. The performance of the decoder is not sensitive to the exact setting of this received constellation radius. Moreover, in order to deemphasize the contribution of a faded—and therefore potentially unreliable—signal point to the decoding process, each of the 2D point metrics may be weighted by a factor proportional to the amplitude of the corresponding received 2D point.

The received N 2D received signal points corresponding to the transmitted codeword are sequentially grouped into N/2 4D elements, each of which are then further processed as follows: We find, for each 4D subset, the one 4D element of that subset which is "closest" to the received 4D element being processed. This is achieved by taking each element of the 4D subset in turn and forming the sum of the two 2D point metrics corresponding to that element. The 4D element corresponding to the smallest such sum—referred to below as the "4D subset metric"—is then identified as the "closest" 4D element. The result to this point, then, is the identification, for each of the received 4D elements, of a particular 4D element and its associated 4D subset metric for each 4D subset.

If the code is a 4D code, then there is only one 4D subset. Thus only one 4D element has been identified and that element is taken to be the transmitted codeword. If the code is an 8D or greater code, the above process iterates for each of the received 8D elements.

In particular, the received N/2 4D received elements are sequentially grouped into N/4 8D elements, each of which is then processed in a manner analogous to the 4D case. In particular, we find, for each 8D subset, the one 8D element of that subset which is "closest" to the received 8D element being processed. This is achieved by taking each 4D-subset pair in the 8D subset in turn and forming the sum of the two 4D subset metrics corresponding to that pair. The 8D element in the 4D-subset pair—which is the pair of 4D elements, one element for each 4D subset, obtained from the previous step—corresponding to the smallest such sum—referred to as the "8D subset metric"—is then identified as the "closest" 8D element.

If the code is an 8D code, then a single 8D element has now been identified. Otherwise, the process is again iterated for 16D, and so forth.

The identified codeword is then mapped into data bits based on the bit assignment scheme associated with the code, e.g., FIGS. 14-17 for Code V.

Advantageously, the above-described decoding process is implementable in a highly parallel fashion, thereby reducing the time required for decoding which allows for the practical implementation of more complicated—and thus more effective—block-coded schemes and/or higher input data rates. In particular, the 2D point metrics can be calculated for each of the N 2D points of a received 2N-dimensional signal all at the same time, and similarly for the 4D and 8D subset metrics. Moreover, once a number of 2N-dimensional signals are available at the deinterleaver output, each of those signals may be decoded independently of the others in parallel fashion. This characteristic of the block codes is not possible with, for example, trellis codes which require sequential processing on each 2D point.

In accordance with a feature of the invention, codes of this type can be combined with space diversity in order to provide even greater performance enhancement. In particular, the receiving station, such as an automobile, is provided with two or more receiving antennas which are separated by at least ¼ wavelength so that the signals received from the respective antennas fade independently from each other. The first step of the decoding process is then carried out for the signal received from each antenna. The resulting "preliminary" 2D point metric associated with each point of the constellation is added to the 2D point metric for that point obtained from the other antennas. The resulting sum is a "final" 2D point metric which is then used as the 2D point metric in the subsequent decoding process steps.

The foregoing merely illustrates the principles of the invention. For example, although the invention is described herein principally in the context of digital cellular mobile radio, it is equally applicable to other fading-signal environments. Moreover, although the foregoing discussion has implicitly assumed that there is only a single user per mobile radio channel, as is the case when a frequency-division-multiplexing-access (FDMA) approach is used, the invention is equally applicable to the case where several users are time-multiplexed onto one channel—the so-called TDMA approach. In such applications, the interleaver design and the format of the TDMA frame should be matched to one another to the maximum extent possible. In particular, the interleaving length should be an integral multiple of the TDMA frame length and should be sufficiently large to ensure an appropriate time separation of signal points of a codeword. This may lead to a requirement that the signal points from a given codeword be dispersed among two or more TDMA frames. Alternatively, the number of time slots assigned to each user within a TDMA frame—which should themselves be as separated as possible within the frame—could be increased to more than one, thereby reducing the interleaving length requirement and/or enhancing the performance. These considerations favor the use of as low a dimensionality coding scheme as possible that will allow other system objectives to be achieved.

These same considerations make trellis-coded schemes less attractive than the block-coded modulation approach of the present invention because a trellis-coded scheme will normally require higher interleaving length—which introduces delay—or a greater number of time slots per user per TDMA frame, which may be inconsistent with other system requirements. Further advantages of the use of block-coded modulation as compared, for example, to trellis-coded modulation are that, once the signals carried in an interleaving frame have been received, the information can all be immediately decoded, which may not be the case for trellis-coded schemes. This property of the block-encoded modulation avoids the delay that might otherwise occur with the trellis-encoded scheme when the system includes a speech decoder following the channel decoder.

Other variations are possible. For example, various values of the parameters M can be chosen, such as M=4, 6, 8, 12, 16, etc. Any integer value greater than unity can be used for the parameter N. For each combination of M and N, various different codes can be arrived at which provide varying combinations of bandwidth efficiency, coding gain and implementational complexity. Codes with X-fold time diversity with X other than 2 may be similarly constructed. Only a small handful of the possible codes have been presented herein. The particular code that is used in a particular application being chosen is a function of the particular needs and constraints of that application. As but one example, since increasing the signalling rate, i.e., the reciprocal of the signalling interval, tends to introduce and/or increase intersymbol interference, then, in order to support a given data rate without encountering an undue amount of intersymbol interference, one might choose a code with a relatively high bandwidth efficiency—even at the expense of possible increase in complexity and/or possible decrease in coding gain—so that the signalling rate can be maintained acceptably low.

Moreover, although the diversity built in to the codes described herein is illustratively exploited in the time domain (by ensuring that the transmission of the signal points which provide the diversity occurs in signalling intervals that are well separated in time), that diversity can also be exploited in other domains such as by transmitting those signal points in physically separate, independently fading channels. Thus although the codes disclosed herein are described as having built-in time diversity, they can be more generally described as having "built-in diversity," of which built-in time diversity is a particular case.

I claim:

1. Apparatus comprising
means for receiving a succession of blocks of input data, and
means for defining an alphabet of codewords each associated with a unique one of the possible values of said input data blocks and for generating, in response to said blocks of input data, the associated ones of said codewords,
each of the codewords of said alphabet being comprised of a combination of at least two modulated signal points taken from a predetermined constellation of modulated signal points, said alphabet of codewords having built-in X-fold diversity so that each of the codewords of said alphabet differs from each other codeword of said alphabet at at least X particular signal points positions, where X is an integer greater than unity, and the minimum squared Euclidean distance between said codewords being greater than the absolute minimum squared Euclidean distance associated with said alphabet.

2. The invention of claim 1 further comprising means for transmitting a signal representing said ones of said codewords.

3. The invention of claim 1 wherein said blocks of input data are received at a rate of m bits every T seconds, where T is a predetermined signalling interval M>0 and wherein said constellation includes more than $2^m$ modulated signal points.

4. The invention of claim 1 wherein said constellation of modulated signal points is an M-PSK constellation, where M is a selected integer.

5. The invention of claim 1 wherein said defining and generating means generates said ones of said codewords by encoding said each block of input data into blocks of encoded bits and by selecting the signal points which comprise each one of said ones of said codewords in response to said each block of encoded bits.

6. The invention of claim 5 wherein said ones of said codewords occur in successive frames of J codewords each, wherein particular ones of the codewords of said alphabet differ in exactly X signal point positions, two of which are the $k^{th}$ and $q^{th}$ signal point positions, and wherein said apparatus further comprises means for generating a re-ordered succession of the signal points of the codewords of each frame in such a way that the signal points at said $k^{th}$ and $q^{th}$ signal point positions are separated by more than J signal points in said succession.

7. The invention of claim 1 wherein each of the codewords of said alphabet differs from each other codeword of said alphabet at at least X particular signal point positions and wherein said apparatus further comprises means for transmitting the signal points comprising said ones of said codewords in respective signalling intervals.

8. The invention of claim 5 wherein said ones of said codewords occur in successive frames of codewords and wherein said apparatus further comprises means for generating a re-ordered succession of the signal points of the codewords of each frame in such a way that the signal points at corresponding signal point positions of the codewords within each frame are grouped together.

9. The invention of claim 8 further comprising means for transmitting a signal representing said re-ordered signal points using carrier phase differences.

10. The invention of claim 8 further comprising means for transmitting a signal representing the re-ordered signal points using carrier phase differences augmented by a constant value.

11. The invention of claim 5 wherein said ones of said codewords occur in successive frames of codewords, wherein each of said codewords is comprised of N signal points, and wherein said apparatus further comprises means for re-ordering the signal points of the codewords of each frame in such a way that, for i = 1, 2, ..., N, the respective $i^{th}$ signal points of the codewords of a frame are arranged in respective groups.

12. The invention of claim 5 wherein said ones of said codewords occur in successive frames of codewords and wherein said apparatus further comprises means for generating a re-ordered succession of the signal points of the codewords of each frame in such a way that, in the re-ordered succession, the separation between the signal points within each codeword is increased.

13. A method for decoding a plurality of sequences of received signal points received over respective fading channels, each of said sequences representing a particular transmitted 2N-dimensional codeword of a predetermined block code, said code being of a type comprised of an alphabet of codewords each of which is, in turn, comprised of a combination of at least two modulated signal points of a constituent constellation, said alphabet being an alphabet which can be formed by (a) selecting particular concatenations of the signal points of the constituent constellation to be a first set of elements, (b) grouping the last-defined set of elements into subsets, (c) selecting at least ones of the elements of particular selected concatenations of the subsets of step (b), and (d) repeating steps (b), (c) and (d) until 2N-dimensional elements are formed, whereby those elements are said 2N-dimensional codewords, said method comprising the steps of measuring, for each particular sequence, the squared Euclidean distance between each received signal point of that particular sequence and all possible transmitted signal points to provide an ensemble of preliminary signal point metrics associated with said each received signal point of said particular sequence, combining the resulting ensembles of preliminary signal point metrics to generate an ensemble of final signal point metrics, finding, for each of a plurality of elements made up of concatenations of received signal points, the closest element from each of the subsets of possible transmitted elements by adding the final signal point metrics corresponding to each element of that particular subset and selecting as said closest element the element corresponding to a subset metric equal to the smallest such sum, finding, for each of a plurality of higher-dimensional elements made up of concatenations of the previously selected closest elements, the closest element from each of the higher-dimensional subsets of possible transmitted elements by adding the subset metrics corresponding to each possible concatenation of subsets of that particular higher-dimensional subset and selecting, as said closest element, the element corresponding to a higher-dimensional subset metric equal to the smallest such sum, and iterating the second of said finding steps until a single 2N-dimensional element is selected, said 2N-dimensional element being the decoded codeword.

14. Apparatus comprising means for receiving a succession of blocks of input data at a rate of m bits every T seconds, where T is a predetermined signalling interval m > 0, means for defining an alphabet of codewords each associated with a unique one of the possible values of said input data blocks and for generating, in response to said blocks of input data, the associated ones of said codewords, each of the codewords of said alphabet being comprised of a combination of at least two modulated signal points taken from a predetermined constellation of modulated signal points, said constellation including more than $2^m$ modulated signal points and said alphabet of codewords having built-in diversity.

15. The invention of claim 14 wherein said defining and generating means generates said ones of said codewords by encoding said each block of input data into blocks of encoded bits and by identifying the signal points which comprise each one of said ones of said codewords in response to said each block of encoded bits.

16. The invention of claim 15 wherein said constellation of modulated signal points is an M-PSK constellation, where M is a selected integer.

17. The invention of claim 16 wherein M is other than an integral power of 2.

18. The invention of claim 15 wherein the minimum squared Euclidean distance between said codewords is greater than the absolute minimum squared Euclidean distance associated with said alphabet.

19. The invention of claim 18 further comprising means for re-ordering the signal points of the resulting stream of codewords in such a way as to increase the separation between those signal points of each codeword which provide said built-in diversity.

20. The invention of claim 19 further comprising means for transmitting a signal representing the re-ordered signal points using carrier phase differences.

21. The invention of claim 19 further comprising means for transmitting a signal representing the re-ordered signal points using carrier phase differences augmented by a constant value.

22. A method comprising the steps of
receiving a succession of blocks of input data, and
generating, in response to said blocks of input data, associated codewords of an alphabet of codewords each associated with a unique one of the possible values of said input data blocks, each of the codewords of said alphabet being comprised of a combination of at least two modulated signal points taken from a predetermined constellation of modulated signal points, said alphabet of codewords having built-in X-fold diversity, where X is an integer greater than unity, and the minimum squared Euclidean distance between said codewords being greater than the absolute minimum squared Euclidean distance associated with said alphabet.

23. The invention of claim 22 comprising the further step of transmitting a signal representing said associated codewords.

24. The invention of claim 23 wherein said blocks of input data are received at a rate of m bits every T seconds, where T is a predetermined signalling interval, and wherein said constellation includes more than $2^m$ modulated signal points.

25. The invention of claim 24 wherein said constellation of modulated signal points is an M-PSK constellation, where M is a selected integer.

26. The invention of claim 25 wherein in said generating step said one of said codewords is generated by encoding said each block of input data into blocks of encoded bits and by selecting the signal points which comprise said one of said codewords in response to said each block of encoded bits.

27. The invention of claim 22 wherein each of the codewords of said alphabet differs from each other codeword of said alphabet at at least X particular signal point positions.

28. The invention of claim 26 wherein each of the codewords of said alphabet differs from each other codeword of said alphabet at at least X particular signal point positions and wherein said method comprises the further step of transmitting the signal points comprising said associated codewords in respective signalling intervals.

29. The invention of claim 27 wherein said associated codewords occur in successive frames of codewords and wherein said method comprises the further step of generating a re-ordered succession of the signal points of the codewords of each frame in such a way that the signal points at corresponding signal point positions of the codewords within each frame are grouped together.

30. The invention of claim 29 comprising the further step of transmitting a signal representing said re-ordered signal points using carrier phase differences.

31. The invention of claim 29 comprising the further step of transmitting a signal representing the re-ordered signal points using carrier phase differences augmented by a constant value.

32. The invention of claim 27 wherein said associated codewords occur in successive frames of codewords, wherein each of said codewords is comprised of N signal points and wherein said method comprises the further step of re-ordering the signal points of the codewords of each frame in such a way that, for i=1, 2, . . . , N, the respective $i^{th}$ signal points of the codewords of a frame are arranged in respective groups.

33. The invention of claim 27 wherein said associated codewords occur in successive frames of codewords and wherein said method comprises the further step of generating a re-ordered succession of the signal points of the codewords of each frame in such a way that, in the re-ordered succession, the separation between the signal points within each codeword is increased.

34. The invention of claim 27 wherein said associated codewords occur in successive frames of J codewords each, wherein particular ones of the codewords of said alphabet differ in exactly X signal point positions, two of which are the $k^{th}$ and $q^{th}$ signal point positions, and wherein said method comprises the further step of generating a re-ordered succession of the signal points of the codewords of each frame in such a way that the signal points at said $k^{th}$ and $q^{th}$ signal point positions are separated by more than J signal points in said succession.

35. A method comprising the steps of
receiving a succession of blocks of input data at a rate of m bits every T seconds, where T is a predetermined signalling interval m>0,
generating, in response to said blocks of input data, associated codewords of an alphabet of codewords each associated with a unique one of the possible values of said input data blocks, each of the codewords of said alphabet being comprised of a combination of at least two modulated signal points taken from a predetermined constellation of modulated signal points, said constellation including more than $2^m$ modulated signal points and said alphabet of codewords having built-in diversity.

36. The invention of claim 35 wherein in said generating step said ones of said codewords are generated by encoding said each block of input data into blocks of encoded bits and by identifying the signal points which comprise each one of said generated codewords in response to said each block of encoded bits.

37. The invention of claim 36 wherein said constellation of modulated signal points is an M-PSK constellation, where M is a selected integer.

38. The invention of claim 37 wherein M is other than an integral power of 2.

39. The invention of claim 36 wherein the minimum squared Euclidean distance between said codewords is greater than the absolute minimum squared Euclidean distance associated with said alphabet.

40. The invention of claim 39 comprising the further step of reordering the signal points of the resulting stream of codewords in such a way as to increase the separation between those signal points of each codeword which provide said X-fold built-in diversity.

41. The invention of claim 40 comprising the further step of transmitting a signal representing the re-ordered signal points using carrier phase differences.

42. The invention of claim 40 comprising the further step of transmitting a signal representing the re-ordered signal points using carrier phase differences augmented by a constant value.

43. A method comprising the steps of
receiving a succession of blocks of input data, and
defining an alphabet of 2N-dimensional codewords each associated with a unique one of the possible values of said input data blocks and generating, in response to each of said blocks of input data, the associated one of said codewords, each of the codewords of said alphabet being comprised of a combination of at least two modulated signal points of a constituent constellation, said alphabet of codewords having built-in diversity, and said alphabet being an alphabet which can be formed by (a) selecting particular concatenations of the signal points of the constituent constellation to be a first set of elements, (b) grouping the last-defined set of elements into subsets, (c) selecting at least ones of the elements of particular selected concatenations of the subsets of step (b), and (d) repeating steps (b), (c) and (d) until 2N-dimensional elements are formed, whereby those elements are said 2N-dimensional codewords.

44. A method for decoding a sequence of received signal points representing a transmitted 2N-dimensional codeword of a predetermined block code, said code being of a type comprised of an alphabet of codewords each of which is, in turn, comprised of a combination of at least two modulated signal points of a constituent constellation, said alphabet being an alphabet which can be formed by (a) selecting particular concatenations of the signal points of the constituent constellation to be a first set of elements, (b) grouping the last-defined set of elements into subsets, (c) selecting at least ones of the elements of particular selected concatenations of the subsets of step (b), and (d) repeating steps (b), (c) and (d) until 2N-dimensional elements are formed, whereby those elements are said 2N-dimensional codewords, said method comprising the steps of measuring the squared Euclidean distance between each received signal point and all possible transmitted signal points to provide an ensemble of signal point metrics associated with said each received signal point, finding, for each of a plurality of elements made up of concatenations of received signal points, the closest element from each of the subsets of possible transmitted elements by adding the signal point metrics corresponding to each element of that particular subset and selecting as said closest element the element corresponding to a subset metric equal to the smallest such sum, finding, for each of a plurality of higher-dimensional elements made up of concatenations of the previously selected closest elements, the closest element from each of the higher-dimensional subsets of possible transmitted elements by adding the subset metrics corresponding to each possible concatenation of subsets of that particular higher-dimensional subset and selecting, as said closest element, the element corresponding to a higher-dimensional subset metric equal to the smallest such sum, and iterating the second of said finding steps until a single 2N-dimensional element is selected, said 2N-dimensional element being the decoded codeword.

* * * * *